(12) United States Patent
Kiyokawa et al.

(10) Patent No.: US 12,391,473 B2
(45) Date of Patent: Aug. 19, 2025

(54) ARTICLE STORAGE FACILITY

(71) Applicant: Daifuku Co., Ltd., Osaka (JP)

(72) Inventors: Wataru Kiyokawa, Tokyo (JP); Daisuke Katagiri, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 154 days.

(21) Appl. No.: 18/268,707

(22) PCT Filed: Dec. 2, 2021

(86) PCT No.: PCT/JP2021/044269
§ 371 (c)(1),
(2) Date: Jun. 21, 2023

(87) PCT Pub. No.: WO2022/138048
PCT Pub. Date: Jun. 30, 2022

(65) Prior Publication Data
US 2024/0034556 A1    Feb. 1, 2024

(30) Foreign Application Priority Data

Dec. 22, 2020  (JP) .................................. 2020-212456

(51) Int. Cl.
*B65G 1/04* (2006.01)

(52) U.S. Cl.
CPC .................................. *B65G 1/0421* (2013.01)

(58) Field of Classification Search
CPC .. B65G 1/0435; B65G 1/0421; B65G 1/1373; B65G 1/1376
See application file for complete search history.

(56) References Cited

U.S. PATENT DOCUMENTS

| 2017/0057745 | A1* | 3/2017  | Ueda ..................... | B65G 1/1373 |
| 2018/0127208 | A1* | 5/2018  | Preidt ................... | B65G 1/0485 |
| 2018/0339858 | A1* | 11/2018 | Iwata .................... | B65G 1/0435 |
| 2021/0309457 | A1* | 10/2021 | Tsuji .................... | B65G 1/0421 |
| 2022/0135328 | A1* | 5/2022  | Shimamura ........... | B65G 1/0421 |
|              |     |         |                          | 700/218     |
| 2023/0150774 | A1* | 5/2023  | Nakamura ............ | B65G 1/0435 |
|              |     |         |                          | 414/749.1   |

(Continued)

FOREIGN PATENT DOCUMENTS

| JP | 52111173   | 9/1977 |
| JP | 63119509 U | 8/1988 |
| JP | 201652947 A| 4/2016 |

*Primary Examiner* — Kaitlin S Joerger
(74) *Attorney, Agent, or Firm* — The Webb Law Firm

(57) ABSTRACT

A supply device (4) includes a first conveyor (4A) arranged to be adjacent on a first side (Y1) in a second direction with respect to the first transfer device (30A), a second conveyor (4B) arranged to be adjacent on the first side (Y1) in the second direction with respect to a second transfer device (30B), and a third conveyor (4C) including a first connection portion (5A) connected to an end on the first side (Y1) in the second direction of the first conveyor (4A) and a second connection portion (5B) connected to an end on the first side (Y1) in the second direction of the second conveyor (4B). A plurality of articles (W) can be arranged side-by-side in a second direction (Y) on the first conveyor (4A), and a plurality of articles (W) can be arranged side by side in the second direction (Y) on the second conveyor (4B).

10 Claims, 8 Drawing Sheets

(56) References Cited

U.S. PATENT DOCUMENTS

| | | | |
|---|---|---|---|
| 2023/0174301 A1* | 6/2023 | Ueda .................... | B65G 1/0492 |
| | | | 414/279 |
| 2023/0271779 A1* | 8/2023 | Siraisi .................. | B65G 1/0492 |
| | | | 700/218 |
| 2023/0348186 A1* | 11/2023 | Siraisi .................. | B65G 1/0421 |
| 2023/0356945 A1* | 11/2023 | Minematsu .............. | B65G 1/06 |

* cited by examiner

ARTICLE STORAGE FACILITY

CROSS-REFERENCE TO RELATED APPLICATIONS

This application is the United States national phase of International Application No. PCT/JP2021/044269 filed Dec. 2, 2021, and claims priority to Japanese Patent Application No. 2020-212456 filed Dec. 22, 2020, the disclosures of which are hereby incorporated by reference in their entireties.

BACKGROUND OF THE INVENTION

Field of the Invention

The present invention relates to an article storage facility including a transport device having a travel cart, a storage rack having a plurality of storage portions, and a supply device for supplying articles to the transport device.

Description of Related Art

An example of such an article storage facility is disclosed in Japanese Utility Model Application Laid-Open No. S63-119509 (Patent Document 1). Hereinafter, in the description of this background art, reference numerals and names in Patent Document 1 are quoted in parentheses.

The article storage facility of Patent Document 1 includes a transport device (cargo loading/unloading device 8) including a travel cart (11) that travels on a predetermined travel route (7), a storage rack including a plurality of storage portions (segmented storage spaces 2) arranged along the travel route (7), and a supply device (storage conveyor 21) for supplying articles to the transport device (8). With the direction along the travel route (7) set as the travel direction and the direction perpendicular to the travel direction set as the rack depth direction, the transport device (8) includes two transfer devices (loading/unloading tools 16A and 16B) that are mounted in the travel cart (11) and are arranged side by side in the travel direction, and each transfer device (16A and 16B) is able to hold two articles side by side in the rack depth direction. Also, the supply device (21) is a conveyor that transports two articles (cylindrical cans 6) along the travel direction while the articles (6) are arranged side by side in the rack depth direction.

PATENT DOCUMENTS

Patent Document 1: Japanese Utility Model Laid-Open No. S63-119509 (FIG. 4)

In the article storage facility of Patent Document 1, the supply device can transport two articles in the travel direction while the articles are arranged side by side. Accordingly, if it is not necessary to consider the order of transportation of the articles, or more specifically, the arrangement of the four articles when delivering them to the two transfer devices, such a supply device can efficiently transport and supply the articles.

However, if there is desire to make the order of transportation of the articles a specific order in consideration of increasing the efficiency of the storage operation of the articles on the storage rack by the transport device, in the article storage facility of the above-mentioned Patent Document 1, a device for switching the order of transport of the articles needs to be installed upstream of the supply device. For this reason, there is a problem in that the overall configuration of the article storage facility tends to be complicated or increase in size, and the cost tends to increase.

SUMMARY OF THE INVENTION

In view of this, an article storage facility is needed which includes a storage device that can, with a relatively simple configuration, switch the order of transport of articles and supply them to a transport device having two transfer devices on which a plurality of articles can be arranged side by side.

The article storage facility according to the present disclosure is an article storage facility including: a transport device including a travel cart configured to travel along a predetermined first direction; a storage rack including a plurality of storage portions arranged along the first direction; and a supply device configured to supply an article to the transport device, in which a direction orthogonal to the first direction in a view in an up-down direction is a second direction, one side in the first direction is a first side in the first direction, another side in the first direction is a second side in the first direction, one side in the second direction is a first side in the second direction, and another side in the second direction is a second side in the second direction, the transport device includes a first transfer device and a second transfer device mounted on the travel cart, the second transfer device is arranged on the first side in the first direction with respect to the first transfer device, each of the first transfer device and the second transfer device includes a placement portion on which a plurality of the articles are capable of being placed side by side in the second direction, and performs a transfer operation of the articles between the placement portion and the storage portion by moving the articles in the second direction, the supply device includes a first conveyor arranged so as to be adjacent on the first side in the second direction with respect to the first transfer device when the travel cart is at a predetermined loading position, a second conveyor that is arranged on the first side in the first direction with respect to the first conveyor and is arranged so as to be adjacent on the first side in the second direction with respect to the second transfer device when the travel cart is at the loading position, and a third conveyor that includes a first connection portion connected to an end on the first side in the second direction of the first conveyor and a second connection portion that is connected to an end on the first side in the second direction of the second conveyor, the third conveyor is configured to transport the article in the first direction, the first connection portion is provided at an end on the second side in the first direction of the third conveyor, the first conveyor is configured to transport the article in the second direction, and a plurality of the articles are capable of being arranged side by side in the second direction thereon, and the second conveyor is configured to transport the article in the second direction, and a plurality of the articles are capable of being arranged side by side in the second direction thereon.

According to this configuration, in the configuration in which each of the first transfer device and the second transfer device arranged side by side in the first direction includes the placement portion in which the plurality of articles are capable of being arranged side by side in the second direction, a plurality of articles can be delivered together at the same time from each of the first conveyor and the second conveyor to the corresponding first transfer device or second transfer device. Accordingly, the amount of time required for the transfer operation from the supply device to the two transfer devices can be shortened. In addition, according to this configuration, it is possible to switch the order of transportation of the articles using the second conveyor and the third conveyor and deliver the articles to the first conveyor and the second conveyor by. For example, it is possible to temporarily arrange an article on the second side in the first direction with respect to the second connection portion of the third conveyor, and direct the article transported thereafter toward the second conveyor. That is, it is possible to switch the order of articles to be transported to the second conveyor. Also, for example, the articles can be temporarily withdrawn from the third conveyor to the second conveyor, and the articles transported thereafter can be directed to the first conveyor. That is, it is possible to switch the order of articles to be transported to the first conveyor. Thus, according to this configuration, it is possible to switch the order of transport of articles to the first conveyor and the second conveyor with a relatively simple configuration.

Further features and advantages of the article storage facility will become apparent from the following description of the embodiment described with reference to the drawings.

DESCRIPTION OF THE INVENTION

An embodiment of an article storage facility will be described with reference to the drawings.

Figure 1:
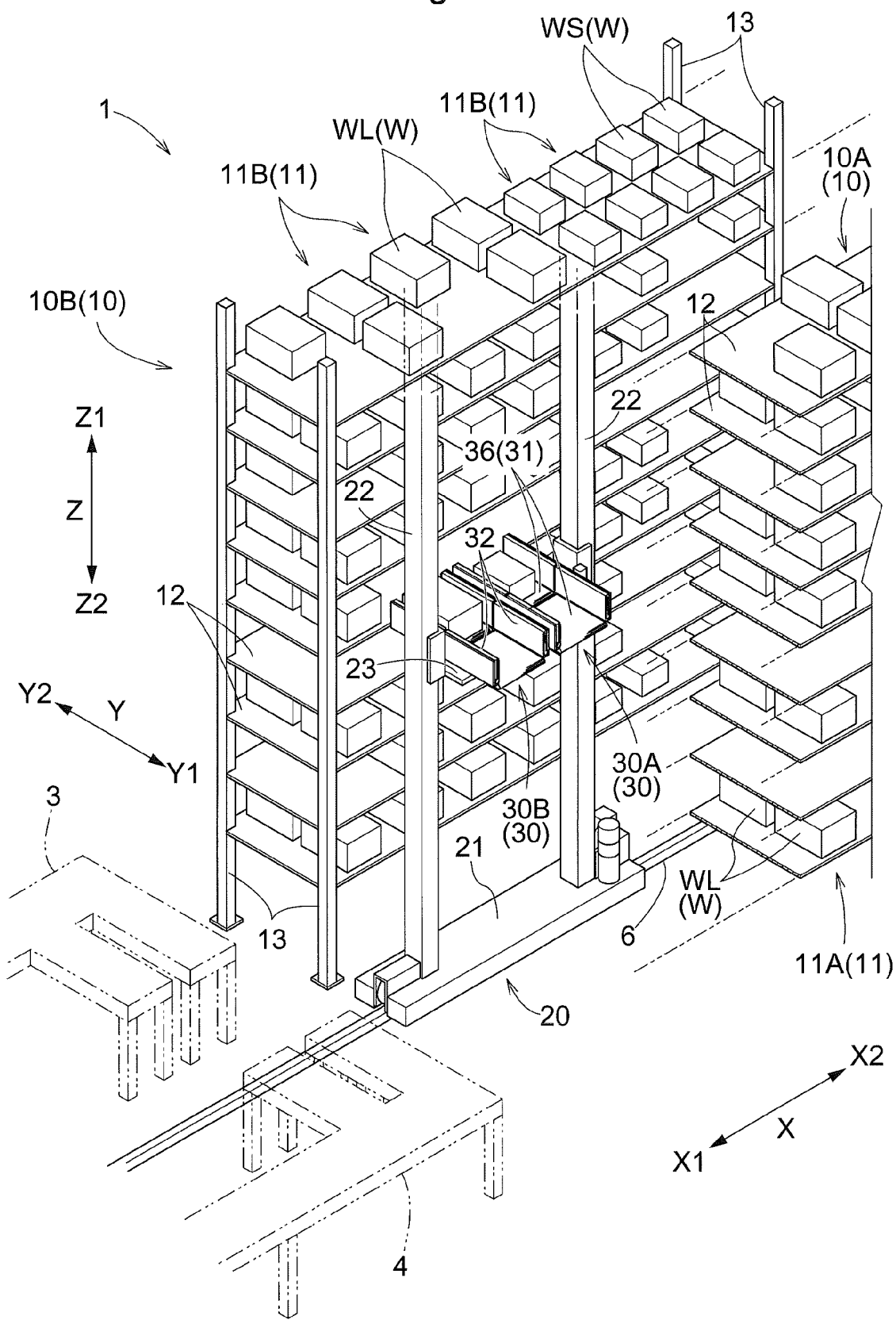
FIG. 1 is a partial perspective view of an article storage facility.
Figure 2:
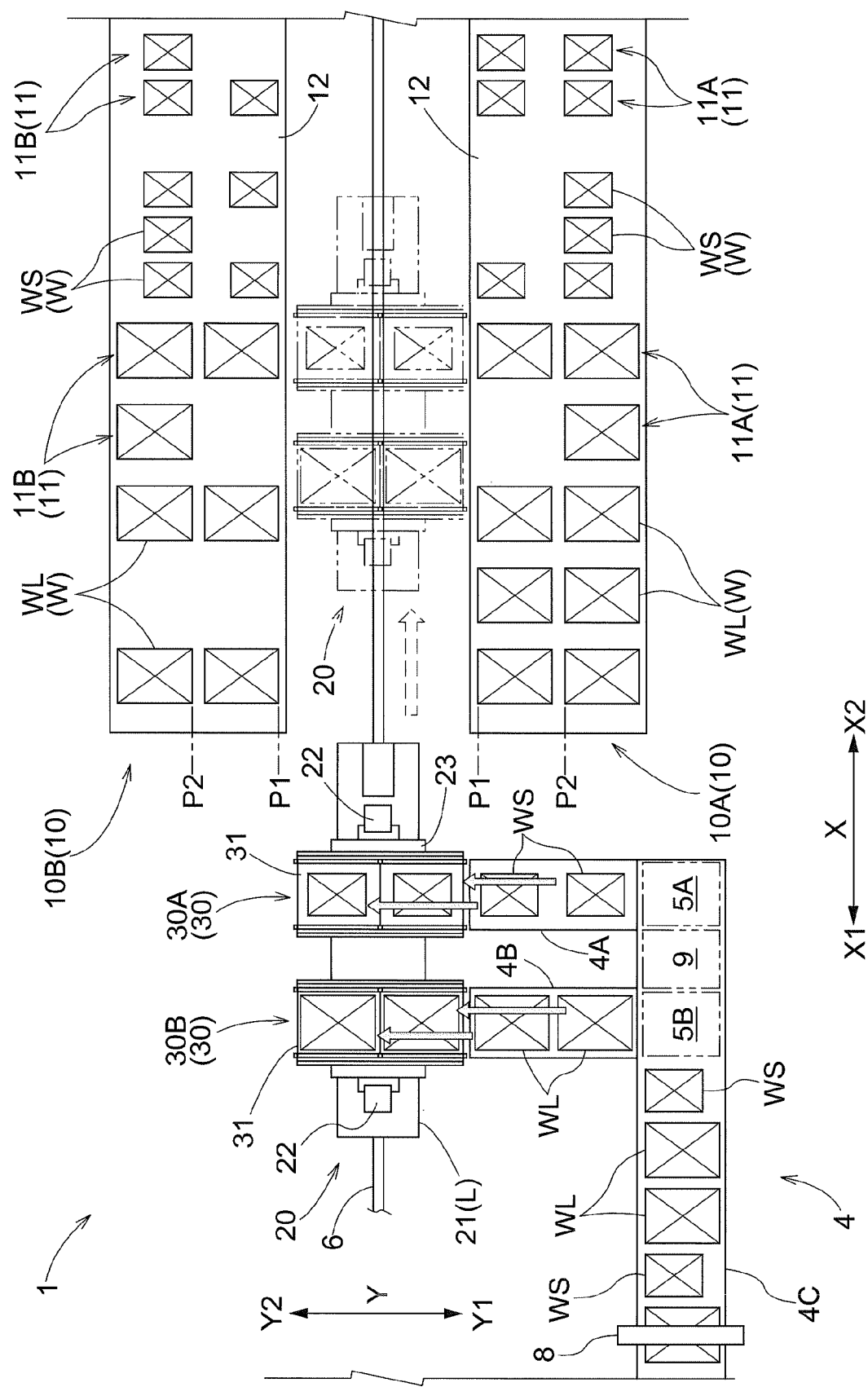
FIG. 2 is a partial plan view of the article storage facility
Figure 9:
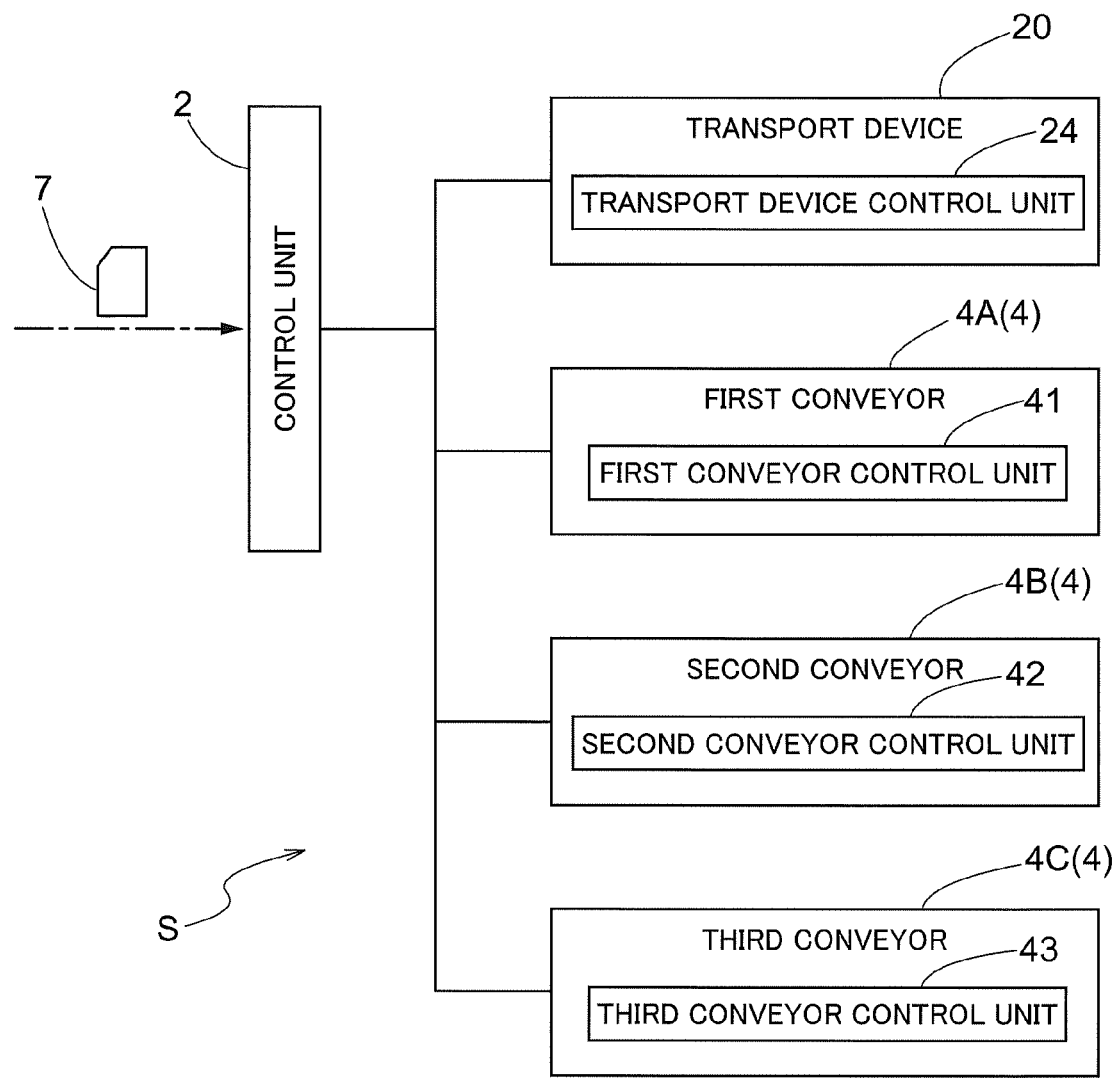
FIG. 9 is a control block diagram.

As shown in FIGS. 1 and 2, the article storage facility 1 includes a transport device 20 having a travel cart 21 that travels along a predetermined first direction X, storage racks 10, and a supply device 4 for supplying articles W to the transport device 20. As shown in FIG. 9, the article storage facility 1 further includes a control system S for controlling the supply device 4.

The storage racks 10 include a plurality of storage portions 11 arranged along the first direction X. In this embodiment, the article storage facility 1 includes a first storage rack 10A and a second storage rack 10B, which are a pair of storage racks 10 arranged facing each other in the second direction Y. The second storage rack 10B is spaced apart in the second direction Y from the first storage rack 10A. The first storage rack 10A includes a plurality of first storage portions 11A arranged along the first direction X, and the second storage rack 10B includes a plurality of second storage portions 11B arranged along the first direction X. Hereinafter, when describing items held in common by the first storage rack 10A and the second storage rack 10B, these are collectively referred to as the storage racks 10, and when describing items held in common by the first storage portions 11A and the second storage portions 11B, these are collectively referred to as the storage portions 11.

In this embodiment, the first direction X is a direction along a horizontal plane. One side in the first direction X is denoted as a first side X1 in the first direction, and the other side in the first direction X (the side opposite to the first side X1 in the first direction) is denoted as a second side X2 in the first direction. The second direction Y is a direction perpendicular to the first direction X in a view in the up-down direction Z (vertical direction). Here, the second direction Y is the direction along the horizontal plane. One side in the second direction Y is denoted as a first side Y1 in the second direction, and the other side in the second direction Y is denoted as a second side Y2 in the second direction. The first storage rack 10A is arranged on the first side Y1 in the second direction with respect to the second storage rack 10B.

As shown in FIG. 1, the storage racks 10 include support shelves 12 that support the articles W (more specifically, support the articles W from a lower side Z2). The support shelves 12 are fixed to support columns 13 erected on the floor. The articles W are stored on the storage racks 10 while being supported by the support shelves 12. That is, the storage portions 11 are formed by the support shelves 12, and the sizes of the storage portions 11 in the second direction Y are determined according to the dimensions in the second direction Y of the support shelves 12. The support shelves 12 are formed in a plate shape (including a case in which a plurality of members are assembled to form a plate shape as a whole), and in this embodiment, as shown in FIG. 1, the plurality of articles W are arranged side by side in the first direction X and supported by one support shelf 12. The articles W are, for example, cardboard cases, container cases, or the like.

Each of the plurality of storage portions 11 (specifically, each of the plurality of first storage portions 11A and each of the plurality of second storage portions 11B) can store a plurality of (in this embodiment, two) articles W arranged side by side in the second direction Y. In other words, the articles W handled by the article storage facility 1 include articles W with a dimension (specifically, a dimension in the direction along the second direction Y when stored in the storage portion 11) according to which a plurality of (in this embodiment, two) articles W can be stored side by side in the second direction Y in the storage portion 11. The articles W handled by the article storage facility 1 may also include an article W with the above-described dimension that is so large that the storage portion 11 is occupied by one article W. If two articles W are stored side by side in the second direction Y in the storage portion 11, as shown in FIG. 2, the article W on the near side (the side on which the article W is taken out and put in by the transport device 20) out of the two articles W is stored at a first storage position P1, and the article W on the far side (the side opposite to the near side in the second direction Y) out of the two articles W is stored at a second storage position P2 on the far side with respect to the first storage position P1.

As shown in FIG. 1, in this embodiment, the storage rack 10 includes a plurality of storage portions 11 aligned in the up-down direction Z. Specifically, the plurality of support shelves 12 are fixed to the support columns 13 at intervals in the up-down direction Z, and the articles W are stored while supported on the support shelves 12 in each of a plurality of levels (rack levels) arranged in the up-down direction Z.

The travel cart 21 travels along the first direction X between the first storage rack 10A and the second storage rack 10B in the second direction Y. In this embodiment, the transport device 20 is a stacker crane. Specifically, the transport device 20 includes, in addition to the travel cart 21, masts 22 erected on the travel cart 21, and an elevation unit 23 that rises and lowers (moves along the up-down direction Z) while being guided by the masts 22. The traveling route of the travel cart 21 is formed by a rail 6 installed along the first direction X. The transport device 20 includes a transfer device 30 mounted on the travel cart 21. In this embodiment, the transfer device 30 is mounted on the travel cart 21 by being supported by the elevation unit 23. The transfer device 30 is moved by a traveling operation of the travel cart 21 (in the present embodiment, by a traveling operation of the travel cart 21 and a raising/lowering operation of the elevation unit 23) to a position corresponding to a transfer target location of the article W (a storage portion 11 or later-described discharging device 3 and the supply device 4). The position corresponding to the transfer target location is a position where the article W can be transferred between the later-described placement portion 31 and the transfer target location, and specifically, is a position where the transfer device 30 opposes the transfer target location in the second direction Y (opposes the transfer target location in the second direction Y at the same height (position in the up-down direction Z)). The transfer device 30 performs the transfer operation of the article W between the placement portion 31 and the transfer target location while being arranged at the position corresponding to the transfer target location.

An article W to be loaded on the storage rack 10 is supplied to the transport device 20 from a loading line or the like via the supply device 4, and thereafter is transported to a storage portion 11 by the transport device 20 and stored in the storage portion 11. An article W to be discharged from the storage rack 10 is taken out from the storage portion 11 by the transport device 20 and transported to the discharging device 3, and thereafter is carried out by the discharging device 3 to an unloading line or the like. The transport device 20 loads and unloads articles W to and from the first storage rack 10A (specifically, the first storage portion 11A) from the second side Y2 in the second direction, and loads and unloads the articles W to and from the second storage rack 10B (specifically, the second storage portion 11B) from the first side Y1 in the second direction.

As shown in FIGS. 1 and 2, the transport device 20 includes a first transfer device 30A and a second transfer device 30B, which are two transfer devices 30. The second transfer device 30B is arranged on the first side X1 in the first direction with respect to the first transfer device 30A. The first transfer device 30A and the second transfer device 30B can perform transfer operations independently of each other. Each of the first transfer device 30A and the second transfer device 30B includes a placement portion 31 on which a plurality of (in this embodiment, two) articles W can be placed side by side in the second direction Y. In other words, the articles W to be handled by the article storage facility 1 include articles W with a dimension (specifically, a dimension along the second direction Y while placed on the placement portion 31) that allow two articles W to be placed side by side in the second direction Y on the placement portion 31.

Each of the first transfer device 30A and the second transfer device 30B moves the article W in the second direction Y to transfer the article W between the placement portion 31 and the storage portion 11. Each of the first transfer device 30A and the second transfer device 30B is capable of transferring the article W between the placement portion 31 and the first storage position P1, and is capable of transferring the article W between the placement portion 31 and the second storage position P2. In the present embodiment, the first transfer device 30A and the second transfer device are supported side by side in the first direction X by the shared elevation unit 23, and rise and lower in one piece accompanying the rising and lowering of the elevation unit 23. Hereinafter, when describing items held in common by the first transfer device 30A and the second transfer device 30B, they are collectively referred to as the transfer device 30.

Figure 3:
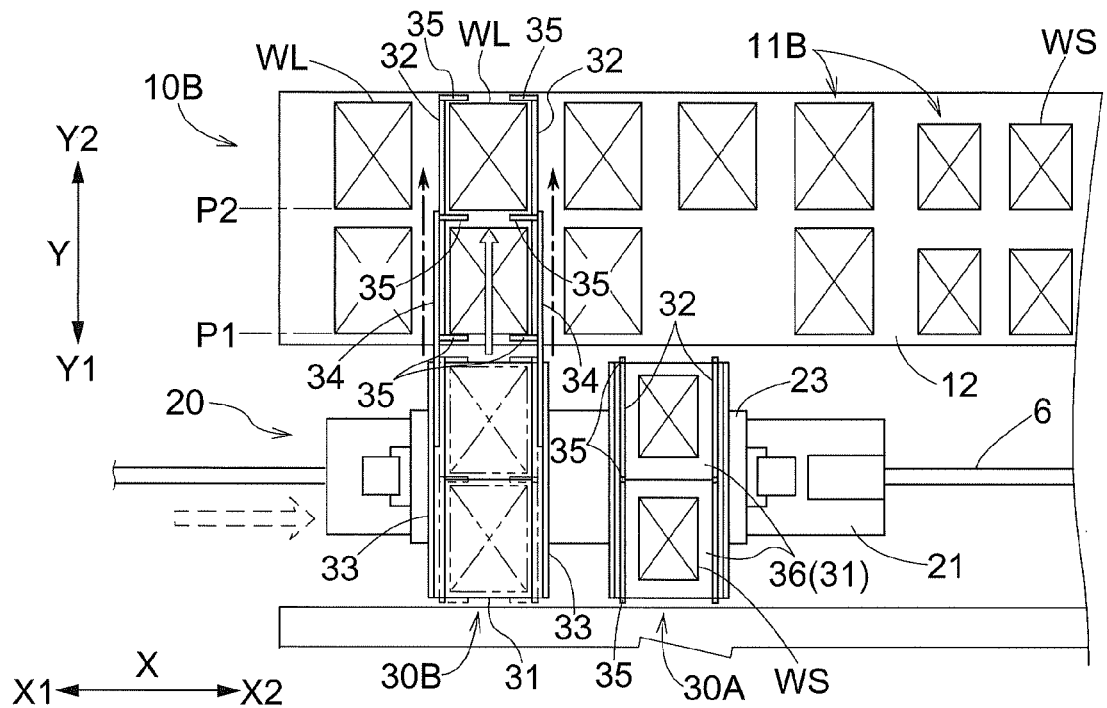
FIG. 3 is a diagram showing one situation of loading control
Figure 4:
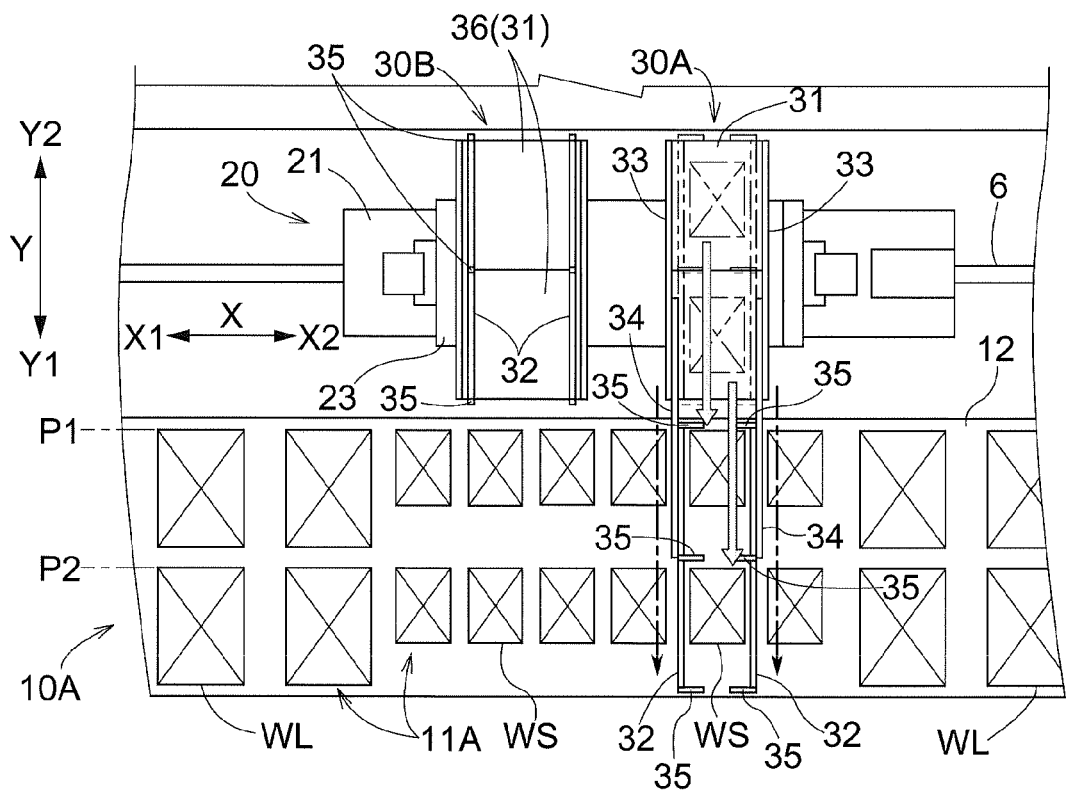
FIG. 4 is a diagram showing one situation of loading control.

Although the configuration of the transfer device 30 is not limited to this, in the present embodiment, as shown in FIGS. 1, 3, and 4, the transfer device 30 includes a pair of arms 32 that can change an interval in the first direction X and extend and retract in the second direction Y. Each of the pair of arms 32 is formed in a flat plate shape with the first direction X being the thickness direction (direction perpendicular to the plate surface). The transfer device 30 transfers the article W between the storage portion 11 (the first storage portion 11A or the second storage portion 11B; the same applies hereinafter) and the placement portion 31 by extending and retracting the pair of arms 32 in the second direction Y while the article W is placed between the pair of arms 32 (specifically, between the pair of arms 32 in the first direction X; the same applies hereinafter). Specifically, the transfer device 30 transfers the article W by extending and retracting the pair of arms 32 in the second direction Y while the interval between the pair of arms 32 in the first direction X is an interval corresponding to the dimension in the first direction X of the article W to be transferred, which is placed between the pair of arms 32. The pair of arms 32 can extend and retract on both sides in the second direction Y, and the transfer device 30 can transfer the article W to both the first storage portion 11A and the second storage portion 11B.

As shown in FIGS. 3 and 4, each of the pair of arms 32 is supported slidably in the second direction Y by a fixed member 33 whose position in the second direction Y (position in the second direction Y with respect to the travel cart 21) is fixed. The arms 32 are arranged on the inner side in the first direction X (the side facing the center position in the first direction X between the pair of arms 32) with respect to the fixed members 33 that support the arms 32. The arms 32 may also be directly supported by the fixed members 33, but in this embodiment, the arms 32 are indirectly supported by the fixed members 33 (specifically, supported via intermediate members 34 arranged between the arms 32 and the fixed members 33).

Among the transfer operations of the article W, the operation of delivering the article W from the placement portion 31 to the storage portion 11 is referred to as an unloading operation, and the operation of receiving the article W in the placement portion 31 from the storage portion 11 is referred to as a pickup operation. The transfer device 30 moves the article W arranged between the pair of arms 32 in the second direction Y by extending and retracting the pair of arms 32, thereby transferring the article W. Specifically, the transfer device 30 moves the article W placed on the placement portion 31 to the first side Y1 in the second direction by extending the pair of arms 32 to the first side Y1 in the second direction, thereby performing an unloading operating of delivering the article W from the placement portion 31 to the first storage portion 11A, and moves the article W stored in the first storage portion 11A to the second side Y2 in the second direction by retracting the pair of arms 32 to the second side Y2 in the second direction, thereby performing a pickup operation of receiving the article W in the placement portion 31 from the first storage portion 11A. Also, the transfer device 30 moves the article W placed on the placement portion 31 to the second side Y2 in the second direction by extending the pair of arms 32 to the second side Y2 in the second direction, thereby performing an unloading operation of delivering the article W from the placement portion 31 to the second storage portion 11B, and moves the article W stored in the second storage portion 11B to the first side Y1 in the second direction by retracting the pair of arms 32 to the first side Y1 in the second direction, thereby performing a pickup operation of receiving the article W in the placement portion 31 from the second storage portion 11B.

As shown in FIGS. 3 and 4, in this embodiment, each of the pair of arms 32 is provided with a hook 35 (an example of a contact member), and the transfer device 30 pushes out or pulls in the article W with the hooks 35 by extending and retracting the pair of arms 32, and thereby moves the article W arranged between the pair of arms 32 in the second direction Y. Specifically, the transfer device 30 pushes the article W placed on the placement portion 31 toward the storage portion 11 with the hooks 35 by extending the pair of arms 32 to deliver the article W to the storage portion 11, and pulls the article W stored in the storage portion 11 toward the placement portion 31 with the hooks 35 by retracting the pair of arms 32 to receive the article W in the placement portion 31.

FIG. 3 shows a situation in which the second transfer device 30B unloads two articles W placed side by side in the second direction Y on the placement portion 31 at the same time, and FIG. 4 shows a situation in which the first transfer device 30A unloads two articles W placed side by side in the second direction Y on the placement portion 31 at the same time. In the situation shown in FIG. 3, one article W is pushed out to the second storage position P2 by the hook 35 provided in the center part in the second direction Y of each of the pair of arms 32, and the other article W is pushed out to the first storage position P1 by the hook 35 provided at the end on the first side Y1 in the second direction of each of the pair of arms 32, whereby the two articles W are unloaded. Also, in the situation shown in FIG. 4, one article W is pushed out to the second storage position P2 by the hook 35 provided in the center part in the second direction Y of each of the pair of arms 32, and the other article W is pushed out to the first storage position P1 by the hook 35 provided at the end on the second side Y2 in the second direction of each of the pair of arms 32, whereby the two articles W are unloaded.

As shown in FIGS. 1, 3, and 4, in the present embodiment, the transfer device 30. (specifically, the placement portion 31) includes a conveyor 36 (e.g., a belt conveyor) that transports the article W in the second direction Y. The article W is placed on the placement portion 31 while being supported by the transport surface of the conveyor 36. The conveyor 36 can transport the article W to both sides in the second direction Y. In this embodiment, the placement portion 31 includes two conveyors 36 capable of performing the operation of transporting the articles W independently of each other. These two conveyors 36 are arranged side by side in the second direction Y, one of the two articles W placed side by side in the second direction Y on the placement portion 31 is placed on the conveyor 36 on the first side Y1 in the second direction, and the other of the two articles W is placed on the conveyor 36 on the second side Y2 in the second direction.

In this embodiment, in the unloading operation, the transfer device 30 causes the conveyor 36 on which the article W is placed to operate so as to match the movement direction and movement speed of the article W due to the extension of the pair of arms 32. Also, in this embodiment, in the pickup operation, the transfer device causes the conveyor 36 on which the article W is placed to operate so as to match the movement direction and movement speed of the article W due to the retraction of the pair of arms 32.

The articles W have a plurality of types with mutually different attributes. The attribute of the article W is a classification obtained by dividing the articles W that can be handled in the article storage facility 1 according to a predetermined criterion. In the present embodiment, the attribute of the article W is the dimension of the outer shape of the article W, and specifically, is the dimension of the outer shape of the article W in the first direction X (specifically, the dimension along the first direction X when the article W is placed on the placement portion 31 or stored in the storage portion 11). In the present embodiment, the type of the article W is determined according to which predetermined dimension class the dimension of the article W (the dimensions of the outer shape of the article W) belongs to. Accordingly, articles W of the same type have dimensions in the first direction X that are equivalent (the same or similar) to each other. FIGS. 1 to 4 show two types of articles W, namely a small article WS, which is an article W belonging to one dimension class, and a large article WL, which is an article W belonging to a dimension class for which the dimension in the first direction X is larger than that one dimension class, but there may also be articles W that belong to dimension classes different from these two dimension classes.

In this embodiment, the transfer device 30 extends and retracts the pair of arms 32 in the second direction Y while the article W is placed between the pair of arms 32, thereby transferring the article W between the storage portion 11 and the placement portion 31. For this reason, if two articles W arranged side by side in the second direction Y on the placement portion 31 have the same dimension in the first direction X, the two articles W can be unloaded at the same time. In the present embodiment, the above-described dimension class is set such that if two articles W arranged side by side in the second direction Y on the placement portion 31 are the same type of article W, the transfer device 30 can transfer the two articles W at the same time.

In this embodiment, as shown in FIGS. 1 and 2, articles W of the same type are stored side by side in the second direction Y in each storage portion 11. In this embodiment, the control unit 2 sets the position and width of the storage portion 11 in the storage rack 10 in the first direction X according to the dimension of the article W in the first direction X when storing the article W in the storage portion 11. For example, the control unit 2 sets the position and width in the first direction X of the storage portion 11 in the storage rack 10 according to the dimension in the first direction X of the articles W to be stored such that the gaps formed between two articles W adjacent to each other in the first direction X are similar to each other. In this manner, by adopting a configuration in which the articles W of the same type are arranged side by side in the second direction Y in each storage portion 11 and the position and width of the storage portion 11 in the storage rack 10 are not fixed, the storage efficiency of the articles W in the storage rack 10 can be improved. Also, from the viewpoint of improving the efficiency of transporting the articles W by the transport device 20, it is preferable that two articles W of the same type are arranged side by side in the second direction Y on the placement portion 31, and thereby the two articles W placed side by side in the second direction Y on the placement portion 31 can be unloaded at the same time as shown in FIGS. 3 and 4. In this article storage facility 1, by configuring the supply device 4 that supplies articles W to the transport device 20 as follows, it is possible to deliver two articles W of the same type to each transfer device 30 together.

As shown in FIG. 2, the supply device 4 includes a first conveyor 4A, a second conveyor 4B, and a third conveyor 4C. Each of the first conveyor 4A, the second conveyor 4B, and the third conveyor 4C conveys articles W arranged in a row. The second conveyor 4B is arranged on the first side in the first direction with respect to the first conveyor 4A. The third conveyor 4C is arranged on the first side Y1 in the second direction with respect to the first conveyor 4A and the second conveyor 4B. Each of the first conveyor 4A, the second conveyor 4B, and the third conveyor 4C is, for example, a roller conveyor or belt conveyor.

The first conveyor 4A is arranged so as to be adjacent to the first transfer device 30A on the first side Y1 in the second direction while the travel cart 21 is at a prescribed loading position L (see FIG. 2). The second conveyor 4B is arranged so as to be adjacent to the second transfer device 30B on the first side Y1 in the second direction while the travel cart 21 is at the loading position L. The loading position L is a position where the transport device 20 receives the supply of the articles W from the supply device 4, and specifically, is a position where the first transfer device 30A receives the supply of the articles W from the first conveyor 4A, and the second transfer device 30B receives the supply of the articles W from the second conveyor 4B. That is, when the travel cart 21 is at the loading position L, the first transfer device 30A is arranged at a position corresponding to the first conveyor 4A, and the second transfer device 30B is arranged at a position corresponding to the second conveyor 4B.

The first conveyor 4A transports the articles W in the second direction Y. The first conveyor 4A can transport the articles W to both sides in the second direction Y. The transfer operation of the article W from the first conveyor 4A to the first transfer device 30A (specifically, the placement portion 31 included in the first transfer device 30A) is performed by at least one (in this embodiment, both) of the first conveyor 4A and the first transfer device 30A. In this embodiment, the article W is moved from the first conveyor 4A to the placement portion 31 of the first transfer device 30A through the transfer operation of the first conveyor 4A and the transfer operation of the conveyor 36 included in the first transfer device 30A, whereby the article W is transferred from the first conveyor 4A to the first transfer device 30A. In this manner, the first transfer device 30A (in this embodiment, the conveyor 36 included in the first transfer device 30A) moves the article W in the second direction Y to transfer the article W between the placement portion 31 and the supply device 4 (specifically, the first conveyor 4A). Note that the movement operation of the article W from the first conveyor 4A to the first transfer device 30A may also be performed by extending and retracting the pair of arms 32 included in the first transfer device 30A.

The second conveyor 4B transports the articles W in the second direction Y. The second conveyor 4B can transport the articles W to both sides in the second direction Y. The transfer operation of the article W from the second conveyor 4B to the second transfer device 30B (specifically, the placement portion 31 included in the second transfer device 30B) is performed by at least one (in this embodiment, both) of the second conveyor 4B and the second transfer device 30B. In this embodiment, the article W is moved from the second conveyor 4B to the placement portion 31 of the second transfer device 30B through the transport operation of the second conveyor 4B and the transport operation of the conveyor 36 included in the second transfer device and thus the article W is transferred from the second conveyor 4B to the second transfer device 30B. In this manner, the second transfer device 30B (in this embodiment, the conveyor 36 included in the second transfer device 30B) moves the article W in the second direction Y to transfer the article W between the placement portion 31 and the supply device 4 (specifically, the second conveyor 4B). Note that the transfer of the article W from the second conveyor 4B to the second transfer device may also be performed by extending and retracting the pair of arms 32 included in the second transfer device 30B.

The third conveyor 4C transports the articles W in the first direction X. The third conveyor 4C can transport the articles W to both sides in the first direction X. The third conveyor 4C includes a first connection portion 5A that is connected to an end on the first side Y1 in the second direction of the first conveyor 4A, and a second connection portion 5B that is connected to an end on the first side Y1 in the second direction of the second conveyor 4B. The first connection portion 5A is provided at the end on the second side X2 in the first direction of the third conveyor 4C. The second connection portion 5B is provided on the first side X1 in the first direction with respect to the first connection portion 5A.

Each of the first connection portion 5A and the second connection portion 5B is provided with a transport direction switching mechanism for switching the transport direction of the article W between the first direction X and the second direction Y As a result, it is possible to transport the article W arranged on the first connection portion 5A to the first conveyor 4A, and to transport the article W arranged on the first conveyor 4A to the first connection portion 5A. In addition, it is possible to transport the article W arranged on the second connection portion 5B to the second conveyor 4B, and to transport the article W arranged on the second conveyor 4B to the second connection portion 5B. The transport direction switching mechanism is configured using, for example, a roller conveyor that transports the article W in the first direction X, and a chain transfer (chain conveyor) that is arranged to be able to move up and down in the gaps between the plurality of rollers that constitute the roller conveyor, and that transports the article W in the second direction Y.

A plurality of articles W (in this embodiment, two articles W) can be arranged side by side in the second direction Y on each of the first conveyor 4A and the second conveyor 4B. For this reason, as shown in FIG. 2, a plurality of articles W (in this embodiment, two articles W) can be delivered together at the same time to the first transfer device 30A, and a plurality of articles W (in this embodiment, two articles W) can be delivered together at the same time to the second transfer device 30B. Each of the first conveyor 4A and the second conveyor 4B includes a plurality of transport portions that are arranged side by side in the second direction Y and are capable of performing transport operations independently of each other. For this reason, for example, it is possible to move only the article W arranged on the first side Y1 in the second direction of the two articles W arranged side by side in the second direction Y, to the first side Y1 in the second direction to transport it to the third conveyor 4C (specifically, the first connection portion 5A or the second connection portion 5B), and it is possible to move only the article W arranged on the second side Y2 in the second direction of the two articles W arranged side by side in the second direction Y, to the second side Y2 in the second direction to transport it to the transport device 20 (specifically, the first transfer device 30A or the second transfer device 30B).

In this embodiment, the third conveyor 4C includes a buffer region 9 in which at least one (in this embodiment, one) article W can be placed, between the first connection portion 5A and the second connection portion 5B in the first direction X. The third conveyor 4C includes a plurality of transport portions that are arranged side by side in the first direction X and are capable of performing a transport operation independently of each other. Specifically, the first connection portion 5A, the second connection portion 5B, the buffer region 9, and the portion adjacent to the second connection portion 5B on the first side X1 in the first direction in the third conveyor 4C can perform the transport operation independently of each other.

As shown in FIG. 2, the articles W to be loaded on the storage rack 10 are supplied from the first side X1 in the first direction to the third conveyor 4C, and the third conveyor 4C transports the articles W to the second side X2 in the first direction to supply the articles W to the first conveyor 4A and the second conveyor 4B. As will be described later with reference to specific examples shown in FIGS. 5 to 8, by changing the order of transport of the articles W to be transported to the first conveyor 4A and the second conveyor 4B, the supply device 4 can arrange at least one set (in this embodiment, one set) of two articles W of the same type that are arranged side by side in the second direction Y on each of the first conveyor 4A and the second conveyor 4B regardless of the order of transport of the articles W on the third conveyor 4C. In the example shown in FIG. 2, a set of two small articles WS arranged side by side in the second direction Y is arranged on the first conveyor 4A, and the articles W are delivered from the first conveyor 4A to the first transfer device 30A such that these two small articles WS are arranged side by side in the second direction Y on the placement portion 31 of the first transfer device 30A. Also, in the example shown in FIG. 2, a set of two large articles WL arranged side by side in the second direction Y is arranged on the second conveyor 4B, and the articles W are delivered from the second conveyor 4B to the second transfer device 30B such that these two large articles WL are arranged side by side in the second direction Y on the placement portion 31 of the second transfer device 30B.

As shown in FIG. 2, a detection device 8 for detecting an attribute of an article W is provided on the transport path of the article W transported by the third conveyor 4C. As described above, in the present embodiment, the attribute of the article W is the dimension (specifically, the dimension in the first direction X) of the outer shape of the article W, and therefore the detection device 8 detects the dimension of the outer shape of the article W. Note that the detection device 8 may also be a device that directly detects the dimension of the article W using detection light or the like, or a device that indirectly detects the dimension of the article W. In the latter case, for example, it is possible to adopt a configuration in which the detection device 8 detects identification information (a barcode, etc.) of the article W to be detected, and the dimension of the article W is acquired by referring to dimension data of the article W associated with the detected identification information. Information on the attribute of the article W detected by the detection device 8 is transmitted to the control unit 2, which will be described later, as attribute data 7 of the article W (see FIG. 9).

As shown in FIG. 9, the article storage facility 1 includes a control unit 2 that controls the operations of the transport device 20 and the supply device 4. The control unit 2 controls the operation of the control target by controlling driving of a driving power source (for example, an electric motor or a solenoid) provided in each portion. The control unit 2 includes a computation processing unit such as a CPU and peripheral circuits such as a memory, and each function of the control unit 2 is realized through cooperation between these pieces of hardware and a program executed on hardware such as the arithmetic processing unit. The control unit 2 may also be constituted by a group of a plurality of pieces of hardware (a plurality of separated pieces of hardware) that can communicate with each other, instead of by one piece of hardware. Also, at least part of the control unit 2 may be provided in one piece with the control target. For example, at least part of the control unit 2 may be provided in the transport device 20.

The transport device 20 operates under the control of the control unit 2. Specifically, the transport device 20 is provided with a transport device control unit 24 (device controller), and the transport device control unit 24 controls each operation of the transport device 20 (traveling operation of the travel cart 21, raising/lowering operation of the elevation unit 23, transfer operation of the transfer device 30) by controlling driving of the driving power source according to a command from the control unit 2.

The supply device 4 operates under the control of the control unit 2. Specifically, the first conveyor 4A is provided with a first conveyor control unit 41 (device controller), and the first conveyor control unit 41 controls the transport operation of the first conveyor 4A by controlling the driving power source according to a command from the control unit 2. In addition, the second conveyor 4B is provided with a second conveyor control unit 42 (device controller), and the second conveyor control unit 42 controls the transport operation of the second conveyor 4B by controlling driving of the driving power source according to a command from the control unit 2. Also, the third conveyor 4C is provided with a third conveyor control unit 43 (device controller), and the third conveyor control unit 43 controls the transport operation of the third conveyor 4C by controlling driving of the driving power source according to a command from the control unit 2. In the present embodiment, the control unit 2 (specifically, the portion of the control unit 2 having the function of controlling the supply device 4), the first conveyor control unit 41, the second conveyor control unit 42, and the third conveyor control unit 43 constitute a control system S for controlling the supply device 4.

Note that the technical features of the control system S disclosed in this specification can also be applied to the control method for the supply device 4, and the control method for the supply device 4 is also disclosed in this specification. This control method includes a step of causing each of the first conveyor 4A, the second conveyor 4B, and the third conveyor 4C to perform the transport operation of the articles W for switching the order of transport of the articles W to be transported to the first conveyor 4A and the second conveyor 4B.

A procedure for switching the order of transport of the articles W by the supply device 4 will be described below with reference to specific examples shown in FIGS. 5 to 8. Note that in FIGS. 5 to 8, the types of articles W are indicated by letters written inside rectangles representing the articles W, and articles W with the same letters represent articles W of the same type. In this embodiment, the control system S acquires information on the attribute (attribute data 7) of the article W detected by the detection device 8 (see FIG. 9), and acquires information on the type of each article W transported by the supply device 4. In FIGS. 5 to 8, a plurality of articles W transported along the third conveyor 4C are, in order starting from the second side X2 in the first direction, which is the downstream side in the transport direction, a first article W1, a second article W2, a third article W3, a fourth article W4, a fifth article W5, and a sixth article W6. FIGS. 5 to 8 show situations at each time point in time chronologically in the order of (a), (b), (c), and (d). Note that in FIGS. 5 to 8, the symbols indicating the first connection portion 5A, the second connection portion 5B, and the buffer region 9 are omitted (see FIG. 2).

Figure 5:
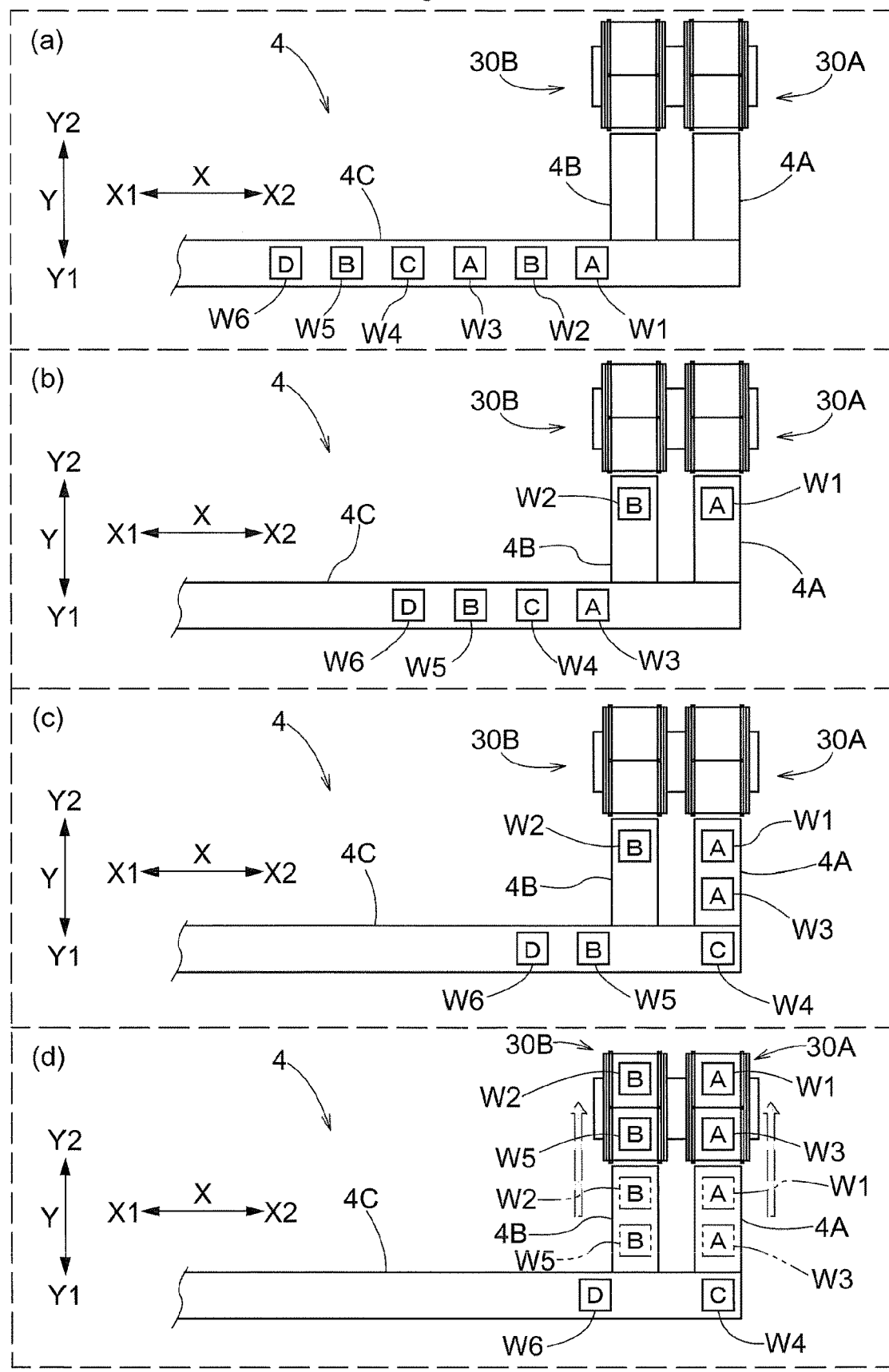
FIG. 5 is a diagram showing one mode of switching an order of transport of articles by a supply device.

In the example shown in FIG. 5, as shown in FIG. 5(a), a first article W1 of a type A, a second article W2 of a type B, a third article W3 of the type A, a fourth article W4 of a type C, a fifth article W5 of the type B, and a sixth article W6 of a type D are transported in the stated order to the second side X2 in the first direction by the third conveyor 4C. The control system S first transports the first article W1 from the third conveyor 4C to the first conveyor 4A. Then, in the case of the first article W1 being of the first type, if the type of the second article W2 is the first type, the control system S transports the second article W2 from the third conveyor 4C to the first conveyor 4A, and if the type of the second article W2 is a second type that is different from the first type, the control system S transports the second article W2 from the third conveyor 4C to the second conveyor 4B. In this example, since the type of the second article W2 is different from the type of the first article W1, the control system S transports the second article W2 from the third conveyor 4C to the second conveyor 4B.

As a result, as shown in FIG. 5(b), the first article W1 is arranged on the first conveyor 4A and the second article W2 is arranged on the second conveyor 4B. Note that, unlike this example, if the type of the second article W2 is the same as the type of the first article W1, the two articles W of the same type (specifically, the two articles W of the type A) are arranged side by side in the second direction Y on the first conveyor 4A.

Next, if the type of the third article W3 is the first type, the control system S transports the third article W3 from the third conveyor 4C to the first conveyor 4A, and if the type of the third article W3 is the second type, the control system S transports the third article W3 from the third conveyor 4C to the second conveyor 4B. In this example, since the type of the third article W3 is the same as the type of the first article W1, the control system S transports the third article W3 from the third conveyor 4C to the first conveyor 4A. As a result, two articles W of the same type (specifically, two articles W of type A) are arranged side by side in the second direction Y on the first conveyor 4A, as shown in FIG. 5(c).

Next, if the type of the fourth article W4 is the first type and there is room for arranging a new article W on the first conveyor 4A, the control system S transports the fourth article W4 from the third conveyor 4C to the first conveyor 4A, and if the type of the fourth article W4 is the second type and there is room for arranging a new article W on the second conveyor 4B, the control system S transports the fourth article W4 from the third conveyor 4C to the second conveyor 4B. In this example, since the type of the fourth article W4 is neither the first type nor the second type, the control system S controls the supply device 4 as follows. That is, if the type of the fourth article W4 is not the second type, the control system S arranges the fourth article W4 on the second side X2 in the first direction with respect to the second connection portion 5B of the third conveyor 4C, and if the type of the fifth article W5 transported subsequent to the fourth article W4 is the second type, the control system S transports the fifth article W5 from the third conveyor 4C to the second conveyor 4B.

In this example, since the type of the fourth article W4 is different from the type of the second article W2, the control system S arranges the fourth article W4 on the second side X2 in the first direction with respect to the second connection portion of the third conveyor 4C, as shown in FIG. 5(c). In the example shown in FIG. 5(c), the fourth article W4 is arranged at the first connection portion 5A, but the fourth article W4 may also be arranged in the buffer region 9. In this example, since the type of the fifth article W5 is the same as the type of the second article W2, the control system S transports the fifth article W5 from the third conveyor 4C to the second conveyor 4B. As a result, as shown in FIG. 5(d), two articles W of the same type (specifically, two articles W of the type A) are arranged side by side in the second direction Y on the first conveyor 4A, and two articles W of the same type (specifically, two articles W of the type B) are arranged side by side in the second direction Y on the second conveyor 4B. As a result, two articles W of the same type can be delivered at the same time to the corresponding first transfer device 30A or the second transfer device 30B.

Note that unlike this example, if the type of the fourth article W4 is the same as the type of the second article W2, the control system S transports the fourth article W4 from the third conveyor 4C to the second conveyor 4B, and at this time, two articles W of the same type (specifically, two articles W of the type A) are arranged side by side in the second direction Y on the first conveyor 4A, and two articles W of the same type (specifically, two articles W of the type B) are arranged side by side in the second direction Y on the second conveyor 4B.

Figure 6:
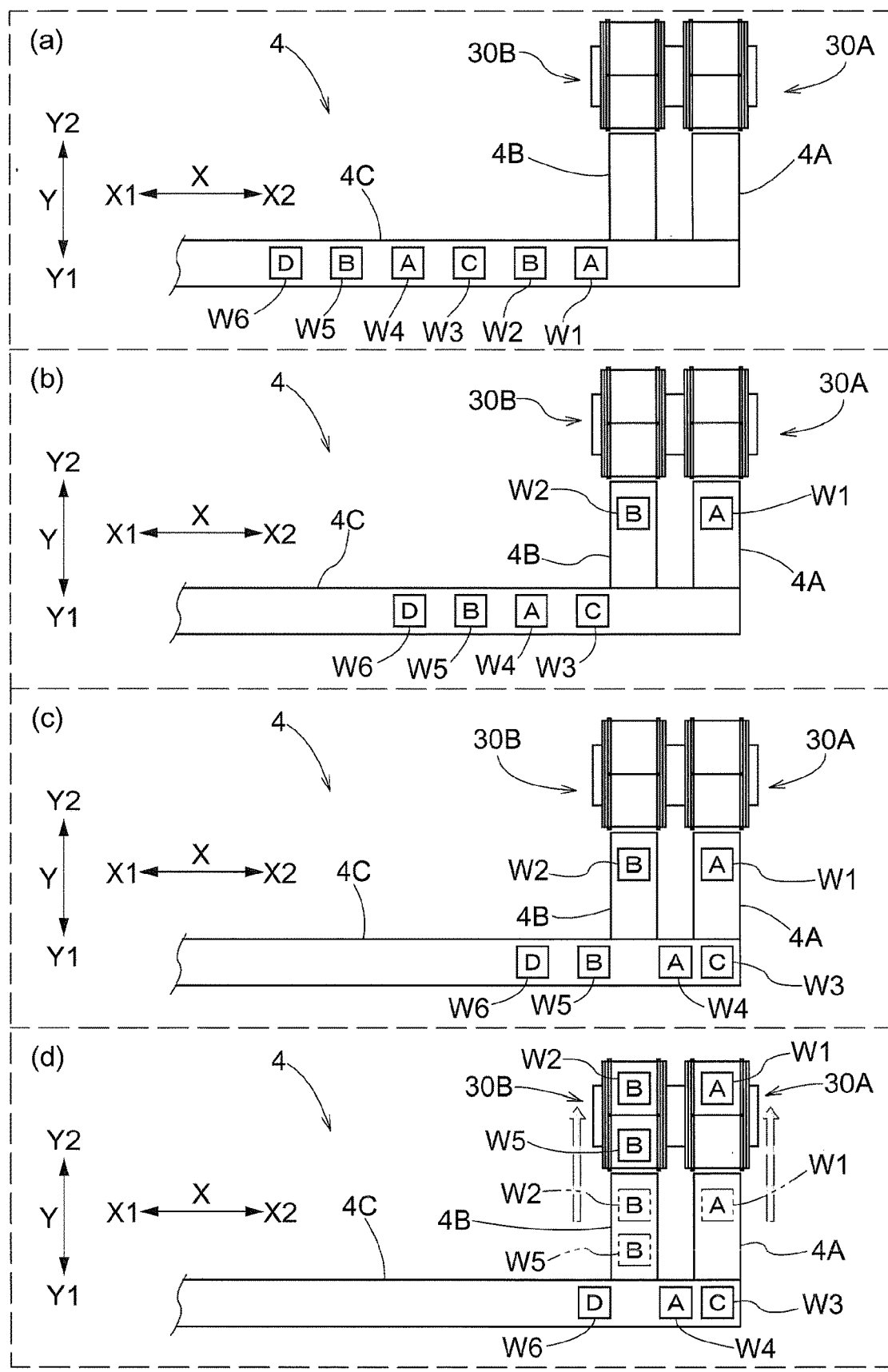
FIG. 6 is a diagram showing one mode of switching the order of transport of articles by a supply device.

In the example shown in FIG. 6, as shown in FIG. 6(a), a first article W1 of a type A, a second article W2 of a type B, a third article W3 of a type C, a fourth article W4 of the type A, a fifth article W5 of the type B, and a sixth article W6 of a type D are transported in the stated order toward the second side X2 in the first direction by the third conveyor 4C. The control system S first transports the first article W1 from the third conveyor 4C to the first conveyor 4A. Then, in the case of the first article W1 being of a first type, if the type of the second article W2 is the first type, the control system S transports the second article W2 from the third conveyor 4C to the first conveyor 4A, and if the type of the second article W2 is a second type that is different from the first type, the control system S transports the second article W2 from the third conveyor 4C to the second conveyor 4B. In this example, since the type of the second article W2 is different from the type of the first article W1, the control system S transports the second article W2 from the third conveyor 4C to the second conveyor 4B. As a result, as shown in FIG. 6(b), the first article W1 is arranged on the first conveyor 4A and the second article W2 is arranged on the second conveyor 4B.

Next, if the type of the third article W3 is the first type, the control system S transports the third article W3 from the third conveyor 4C to the first conveyor 4A, and if the type of the third article W3 is the second type, the control system S transports the third article W3 from the third conveyor 4C to the second conveyor 4B. Also, if the type of the third article W3 is neither the first type nor the second type, the control system S arranges the third article W3 on the second side X2 in the first direction with respect to the second connection portion 5B of the third conveyor 4C. In this example, since the type of the third article W3 is different from both the type of the first article W1 and the type of the second article W2, as shown in FIG. 6(*c*), the control system S arranges the third article W3 on the second side X2 in the first direction with respect to the second connection portion 5B of the third conveyor 4C. In the example shown in FIG. 6(*c*), the third article W3 is arranged at the first connection portion 5A.

Next, if the type of the fourth article W4 is the second type, the control system S transports the fourth article W4 from the third conveyor 4C to the second conveyor 4B, if the type of the fourth article W4 is not the second type, the control system S arranges the fourth article W4 on the second side X2 in the first direction with respect to the second connection portion 5B of the third conveyor 4C, and if the type of the fifth article W5 transported subsequent to the fourth article W4 is the second type, the control system S transports the fifth article W5 from the third conveyor 4C to the second conveyor 4B. In this example, since the type of the fourth article W4 is different from the type of the second article W2, the control system S arranges the fourth article W4 on the second side X2 in the first direction with respect to the second connection portion 5B of the third conveyor 4C, as shown in FIG. 6(*c*). In the example shown in FIG. 6(*c*), the fourth article W4 is arranged in the buffer region 9. In this example, since the type of the fifth article W5 is the same as the type of the second article W2, the control system S transports the fifth article W5 from the third conveyor 4C to the second conveyor 4B. As a result, as shown in FIG. 6(*d*), one article W (specifically, one article W of the type A) is arranged on the first conveyor 4A, and two articles W of the same type (specifically, two articles W of the type B) are arranged side by side in the second direction Y on the second conveyor 4B. As a result, two articles W of the same type cannot be delivered together to the first transfer device 30A, but two articles W of the same type can be delivered together to the second transfer device 30B.

Figure 7:
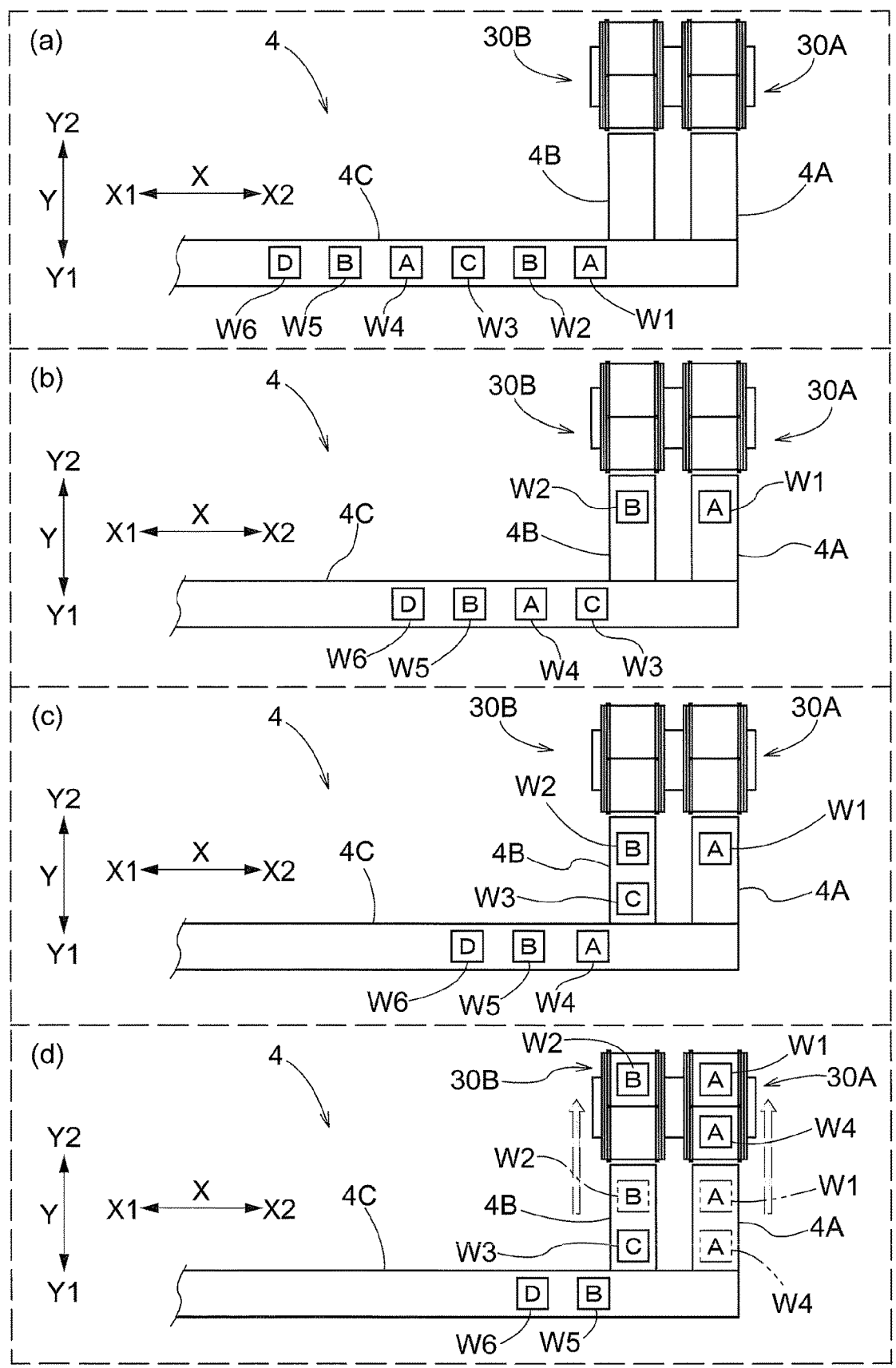
FIG. 7 is a diagram showing one mode of switching the order of transport of articles by a supply device.

In the example shown in FIG. 7, as shown in FIG. 7(*a*), a first article W1 of a type A, a second article W2 of a type B, a third article W3 of a type C, a fourth article W4 of the type A, a fifth article W5 of the type B, and a sixth article W6 of a type D are transported in the stated order toward the second side X2 in the first direction by the third conveyor 4C. That is, FIG. 7(*a*) shows the same situation as FIG. 6(*a*). The control system S first transports the first article W1 from the third conveyor 4C to the first conveyor 4A. Then, in the case of the first article W1 being of a first type, if the type of the second article W2 is the first type, the control system S transports the second article W2 from the third conveyor 4C to the first conveyor 4A, and if the type of the second article W2 is a second type that is different from the first type, the control system S transports the second article W2 from the third conveyor 4C to the second conveyor 4B. In this example, since the type of the second article W2 is different from the type of the first article W1, the control system S transports the second article W2 from the third conveyor 4C to the second conveyor 4B. As a result, as shown in FIG. 7(*b*), the first article W1 is arranged on the first conveyor 4A and the second article W2 is arranged on the second conveyor 4B.

Next, if the type of the third article W3 is the first type, the control system S transports the third article W3 from the third conveyor 4C to the first conveyor 4A, and if the type of the third article W3 is the second type, the control system S transports the third article W3 from the third conveyor 4C to the second conveyor 4B. Also, if the type of the third article W3 is neither the first type nor the second type, the control system S transports the third article W3 from the third conveyor 4C to the second conveyor 4B. Thus, in this example, the control content of the supply device 4 in the case where the type of the third article W3 is neither the first type nor the second type is different from the example shown in FIG. 6. In this example, since the type of the third article W3 is different from both the type of the first article W1 and the type of the second article W2, as shown in FIG. 7(*c*), the control system S transports the third article W3 to the second conveyor 4B.

Next, if the type of the fourth article W4 is the first type and there is room for arranging a new article W on the first conveyor 4A, the control system S transports the fourth article W4 from the third conveyor 4C to the first conveyor 4A. In this example, since the type of the fourth article W4 is the same as the type of the first article W1 and there is room for arranging a new article W on the first conveyor 4A, the control system S transports the fourth article W4 from the third conveyor 4C to the first conveyor 4A. As a result, as shown in FIG. 7(*d*), two articles W of the same type (specifically, two articles W of the type A) are arranged side by side in the second direction Y on the first conveyor 4A, and two articles W of different types (specifically, one article W of the type B and one article W of the type C) are arranged in the second direction Y on the second conveyor 4B. As a result, two articles W of the same type cannot be delivered together at the same time to the second transfer device 30B, but two articles W of the same type can be delivered together at the same time to the first transfer device 30A.

In the example shown in FIG. 7, a case is assumed in which, after the fourth article W4 is transported from the third conveyor 4C to the first conveyor 4A, an article W is supplied from the supply device 4 to the transport device 20, but in the example shown in FIG. 7, since the type of the fifth article W5 transported subsequent to the fourth article W4 is the same as the type of the second article W2, it is also possible to adopt a configuration in which the control system S further controls the supply device 4 as follows. That is, if the type of the fifth article W5 transported subsequent to the fourth article W4 is the second type, the control system S moves the third article W3 from the second conveyor 4B to the third conveyor 4C to arrange the third article W3 on the second side X2 in the first direction with respect to the second connection portion of the third conveyor 4C, and transports the fifth article W5 from the third conveyor 4C to the second conveyor 4B. In this example, since the type of the fifth article W5 is the same as the type of the second article W2, if such a configuration is used, the control system S moves the third article W3 from the second conveyor 4B to the third conveyor 4C to arrange the third article W3 on the second side X2 in the first direction with respect to the second connection portion 5B of the third conveyor 4C, and transports the fifth article W5 from the third conveyor 4C to the second conveyor 4B. As a result, two articles W of the same type can be arranged side by side in the second direction Y on the second conveyor 4B as well as on the first conveyor 4A.

Figure 8:
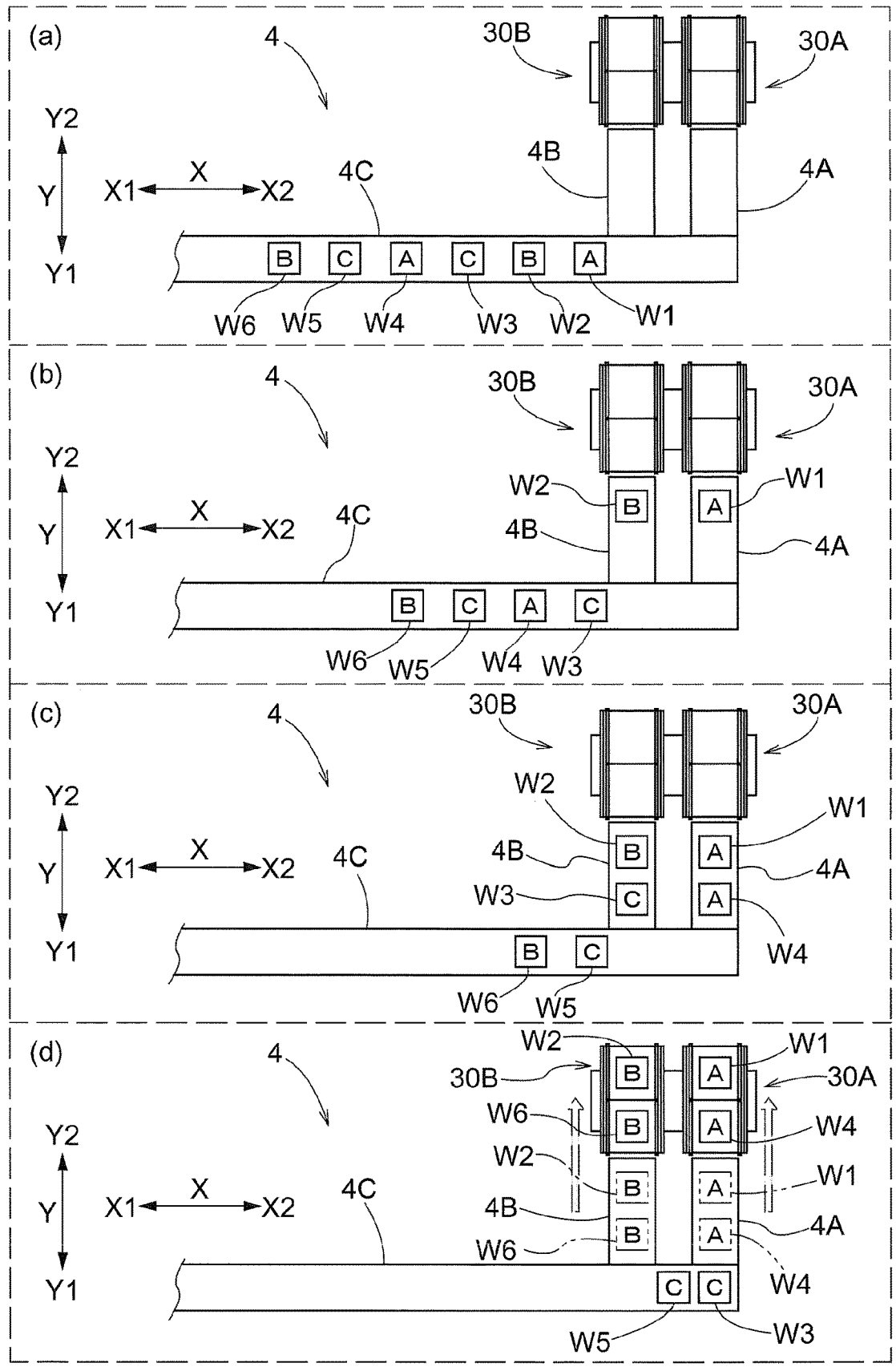
FIG. 8 is a diagram showing one mode of switching the order of transport of articles by a supply device.

In the example shown in FIG. 8, as shown in FIG. 8(*a*), a first article W1 of a type A, a second article W2 of a type B, a third article W3 of a type C, a fourth article W4 of the type A, a fifth article W5 of the type C, and a sixth article W6 of the type B are transported in the stated order by the third conveyor 4C toward the second side X2 in the first direction. The control system S first transports the first article W1 from the third conveyor 4C to the first conveyor 4A. Then, in the case of the first article W1 being of a first type, if the type of the second article W2 is the first type, the control system S transports the second article W2 from the third conveyor 4C to the first conveyor 4A, and if the type of the second article W2 is a second type that is different from the first type, the control system S transports the second article W2 from the third conveyor 4C to the second conveyor 4B. In this example, since the type of the second article W2 is different from the type of the first article W1, the control system S transports the second article W2 from the third conveyor 4C to the second conveyor 4B. As a result, as shown in FIG. 8(b), the first article W1 is arranged on the first conveyor 4A and the second article W2 is arranged on the second conveyor 4B.

Next, if the type of the third article W3 is the first type, the control system S transports the third article W3 from the third conveyor 4C to the first conveyor 4A, and if the type of the third article W3 is the second type, the control system S transports the third article W3 from the third conveyor 4C to the second conveyor 4B. Also, if the type of the third article W3 is neither the first type nor the second type, the control system S transports the third article W3 from the third conveyor 4C to the second conveyor 4B. In this example, since the type of the third article W3 is different from both the type of the first article W1 and the type of the second article W2, as shown in FIG. 8(c), the control system S transports the third article W3 to the second conveyor 4B.

Next, if the type of the fourth article W4 is the first type and there is room for arranging a new article W on the first conveyor 4A, the control system S transports the fourth article W4 from the third conveyor 4C to the first conveyor 4A. In this example, since the type of the fourth article W4 is the same as the type of the first article W1 and there is room for arranging a new article W on the first conveyor 4A, the control system S transports the fourth article W4 from the third conveyor 4C to the first conveyor 4A. Then, if the type of the fifth article W5 transported subsequent to the fourth article W4 is the second type, the control system S moves the third article W3 from the second conveyor 4B to the third conveyor 4C to arrange the third article W3 on the second side X2 in the first direction with respect to the second connection portion of the third conveyor 4C, transports the fifth article W5 from the third conveyor 4C to the second conveyor 4B. On the other hand, if the type of the fifth article W5 is not the second type, the control system S moves the third article W3 from the second conveyor 4B to the third conveyor 4C to arrange the third article W3 on the second side X2 in the first direction with respect to the second connection portion 5B of the third conveyor 4C, and arranges the fifth article W5 on the second side X2 in the first direction with respect to the second connection portion 5B on the third conveyor 4C, and if the type of the sixth article W6 transported subsequent to the fifth article W5 is the second type, the control system S transports the sixth article W6 from the third conveyor 4C to the second conveyor 4B.

In this example, since the type of the fifth article W5 is different from the type of the second article W2 and the type of the sixth article W6 is the same as the type of the second article W2, the control system S moves the third article W3 from the second conveyor 4B to the third conveyor 4C to arrange the third article W3 on the second side X2 in the first direction with respect to the second connection portion 5B of the third conveyor 4C and arranges the fifth article W5 on the second side X2 in the first direction with respect to the second connection portion 5B on the third conveyor 4C, and thereafter transports the sixth article W6 from the third conveyor 4C to the second conveyor 4B. As a result, as shown in FIG. 8(d), two articles W of the same type (specifically, two articles W of the type A) are arranged side by side in the second direction Y on the first conveyor 4A and two articles W of the same type (specifically, two articles W of the type B) are arranged side by side in the second direction Y on the second conveyor 4B. As a result, two articles W of the same type can be delivered at the same time to the corresponding first transfer device 30A or second transfer device 30B. Note that in the example shown in FIG. 8(d), the third article W3 is arranged at the first connection portion 5A and the fifth article W5 is arranged in the buffer region 9.

Here, a case is assumed in which the control system S performs the transport operation of moving the third article W3 from the second conveyor 4B to the third conveyor 4C to arrange the third article W3 on the second side X2 in the first direction with respect to the second connection portion 5B of the third conveyor 4C, prior to the transport operation for arranging the fifth article W5 on the second side X2 in the first direction with respect to the second connection portion 5B of the third conveyor 4C. For this reason, as shown in FIG. 5(d), the third article W3 is arranged on the second side X2 in the first direction with respect to the fifth article W5 on the third conveyor 4C. Unlike such a configuration, it is also possible to adopt a configuration in which the control system S performs the transport operation for moving the third article W3 from the second conveyor 4B to the third conveyor 4C to arrange the third article W3 on the second side X2 in the first direction with respect to the second connection portion 5B of the third conveyor 4C after the transport operation for arranging the fifth article W5 on the second side X2 in the first direction with respect to the second connection portion 5B on the third conveyor 4C. In this case, unlike the example shown in FIG. the third article W3 is arranged on the first side X1 in the first direction with respect to the fifth article W5 on the third conveyor 4C. For example, the fifth article W5 is arranged at the first connection portion 5A and the third article W3 is arranged in the buffer region 9.

OTHER EMBODIMENTS

Next, other embodiments of the article storage facility will be described.

(1) In the above embodiment, as an example, a configuration was described in which the third conveyor 4C includes the buffer region 9 between the first connection portion 5A and the second connection portion 5B in the first direction X. However, the present disclosure is not limited to such a configuration, and it is also possible to adopt a configuration in which the third conveyor 4C does not include the buffer region 9, and the first connection portion 5A and the second connection portion 5B are arranged adjacent to each other in the first direction X.

(2) In the above embodiment, as an example, a configuration was described in which the attribute of the article W is the dimension of the outer shape of the article W. However, the present disclosure is not limited to such a configuration, and it is also possible to adopt a configuration in which the attribute of the article W is a classification other than the dimension of the outer shape of the article W, and the type of the article W is determined according to the classification. Examples of attributes of the article W other than the dimension of the outer shape of the article W can include the type of cargo (product, etc.) stored in the article W, the order of transport to which the article W belongs (i.e., to which the article W is assigned), the outer shape of the article W, and the weight of the article W.
(3) In the above embodiment, as an example, a configuration was described in which the control unit 2 sets the position and width in the first direction X of the storage portion 11 in the storage rack 10 according to the dimension in the first direction X of the article W when storing the article W in the storage portion 11. However, the present disclosure is not limited to such a configuration, and it is also possible to adopt a configuration in which the position and width of the storage portion 11 in the storage rack 10 are fixed.
(4) In the above embodiment, as an example, a configuration was described in which the hooks 35 are provided on each of the pair of arms 32, and the transfer device moves the article W arranged between the pair of arms 32 in the second direction Y by pushing or pulling in the article W with the hooks 35 by extending and retracting the pair of arms 32. However, the present disclosure is not limited to such a configuration, and it is also possible to adopt a configuration in which the hooks 35 are not provided on each of the pair of arms 32. For example, it is possible to adopt a configuration in which the transfer device 30 extends and retracts the pair of arms 32 that hold the article W from both sides in the first direction X, thereby moving the article W arranged between the pair of arms 32 in the second direction Y. In such a configuration, each of the pair of arms 32 may be provided with a conveyor (e.g., a belt conveyor) that comes into contact with the side surface of the article W and transports the article W in the second direction Y, and the article W arranged between the pair of arms 32 may be moved in the second direction Y by the operation of the conveyor, in addition to the extension and retraction of the pair of arms 32. It is also possible to adopt a configuration in which the transfer device 30 includes a support portion that supports the article W from the lower side Z2 instead of the pair of arms 32, and performs a transfer operation of the article W by extending and retracting the support portion in the second direction Y.
(5) In the above embodiment, as an example, a configuration was described in which the placement portion 31 includes the conveyor 36 for transporting the article W in the second direction Y (in the example of the above embodiment, two conveyors 36 arranged side by side in the second direction Y), and in the transfer operation, the transfer device 30 causes the conveyor 36 to operate so as to match the movement direction and movement speed of the article W caused by the extension and retraction of the pair of arms 32. However, the present disclosure is not limited to such a configuration, and it is also possible to adopt a configuration in which the placement portion 31 does not include the conveyor 36, and the article W slides on the placement portion 31 (specifically, on the support surface facing the upper side Z1 of the placement portion 31) accompanying the transfer operation.
(6) In the above embodiment, as an example, a configuration was described in which the first transfer device 30A and the second transfer device 30B are supported side by side in the first direction X by a shared elevation unit 23, and are raised and lowered in one piece accompanying the raising and lowering of the elevation unit 23. However, the present disclosure is not limited to such a configuration, and it is also possible to adopt a configuration in which the first transfer device 30A and the second transfer device 30B are raised and lowered independently of each other due to being supported by two elevation units that can raise and lower independently of each other.
(7) In the above embodiment, a configuration in which the transport device 20 is a stacker crane was described as an example. However, the present disclosure is not limited to such a configuration, and the transport device 20 can also be, for example, a transfer device other than a stacker crane, such as a transfer device that travels along travel routes provided in correspondence with the levels of the storage rack 10.
(8) In the above-described embodiment, as an example, a configuration was described in which the storage rack 10 includes a plurality of storage portions 11 aligned in the up-down direction Z. However, the present disclosure is not limited to such a configuration, and it is also possible to adopt a configuration in which the storage rack 10 includes the storage portions 11 at only one height. Also, in the above-described embodiment, as an example, a configuration was described in which the article storage facility 1 includes a pair of storage racks 10 arranged facing each other in the second direction Y. However, the present disclosure is not limited to such a configuration, and it is also possible to adopt a configuration in which the article storage facility 1 includes the storage rack 10 only on one side in the second direction Y with respect to the travel route of the travel cart 21.
(9) The configurations disclosed in the above-described embodiment can also be applied in combination with configurations disclosed in other embodiments (includes combinations of embodiments described as other embodiments) as long as there are no technical discrepancies. Regarding other configurations as well, the embodiments disclosed in this specification are merely examples in all respects. Accordingly, various modifications can be made as appropriate without departing from the scope of the present disclosure.

SUMMARY OF THE ABOVE EMBODIMENT

An overview of the article storage facility described above will be described below.

An article storage facility includes: a transport device including a travel cart configured to travel along a predetermined first direction; a storage rack including a plurality of storage portions arranged along the first direction; and a supply device configured to supply an article to the transport device, in which a direction orthogonal to the first direction in a view in an up-down direction is a second direction, one side in the first direction is a first side in the first direction, another side in the first direction is a second side in the first direction, one side in the second direction is a first side in the second direction, and another side in the second direction is a second side in the second direction, the transport device includes a first transfer device and a second transfer device mounted on the travel cart, the second transfer device is arranged on the first side in the first direction with respect to the first transfer device, each of the first transfer device and the second transfer device includes a placement portion on which a plurality of the articles are capable of being placed side by side in the second direction, and performs a transfer operation of the articles between the placement portion and the storage portion by moving the articles in the second direction, the supply device includes a first conveyor arranged so as to be adjacent on the first side in the second direction with respect to the first transfer device when the travel cart is at a predetermined loading position, a second conveyor that is arranged on the first side in the first direction with respect to the first conveyor and is arranged so as to be adjacent on the first side in the second direction with respect to the second transfer device when the travel cart is at the loading position, and a third conveyor that includes a first connection portion connected to an end on the first side in the second direction of the first conveyor and a second connection portion that is connected to an end on the first side in the second direction of the second conveyor, the third conveyor is configured to transport the article in the first direction, the first connection portion is provided at an end on the second side in the first direction of the third conveyor, the first conveyor is configured to transport the article in the second direction, and a plurality of the articles are capable of being arranged side by side in the second direction thereon, and the second conveyor is configured to transport the article in the second direction, and a plurality of the articles are capable of being arranged side by side in the second direction thereon.

According to this configuration, in the configuration in which each of the first transfer device and the second transfer device arranged side by side in the first direction includes a placement portion on which a plurality of articles can be arranged side by side in the second direction, a plurality of articles can be delivered together at the same time from each of the first conveyor and the second conveyor to the corresponding first transfer device or second transfer device. Accordingly, the amount of time required for the transfer operation from the supply device to the two transfer devices can be shortened. In addition, according to this configuration, it is possible to deliver the articles to the first conveyor and the second conveyor with the order of transport of the articles switched, using the second conveyor and the third conveyor. For example, it is possible to temporarily arrange an article on the second side in the first direction with respect to the second connection portion of the third conveyor, and direct the article transported thereafter toward the second conveyor. That is, it is possible to switch the order of articles to be transported to the second conveyor. Also, for example, the articles can be temporarily withdrawn from the third conveyor to the second conveyor, and the articles transported thereafter can be directed to the first conveyor. That is, it is possible to switch the order of articles to be transported to the first conveyor. Thus, according to this configuration, it is possible to switch the order of transport of articles to be transported to the first conveyor and the second conveyor with a relatively simple configuration.

Here, it is preferable that the third conveyor includes, between the first connection portion and the second connection portion in the first direction, a buffer region in which at least one article is capable of being arranged.

According to this configuration, articles can be temporarily arranged in the buffer region in addition to the first connection portion on the second side in the first direction with respect to the second connection portion on the third conveyor. That is, it is possible to temporarily hold a plurality of articles on the second side in the first direction with respect to the second connection portion of the third conveyor, and direct the articles transported thereafter toward the second conveyor. This makes it easier to switch the order of the articles to be transported to the second conveyor.

Also, it is preferable to further include a control system configured to control the supply device, in which the articles have a plurality of types with mutually different attributes, the plurality of articles transported along the third conveyor are, in order starting from the second side in the first direction, which is a downstream side in a transport direction, a first article, a second article, a third article, and a fourth article, the control system transports the first article from the third conveyor to the first conveyor, the type of the first article is a first type, if the type of the second article is the first type, the control system transports the second article from the third conveyor to the first conveyor, and if the type of the second article is a second type that is different from the first type, the control system transports the second article from the third conveyor to the second conveyor, if the type of the third article is the first type, the control system transports the third article from the third conveyor to the first conveyor, and if the type of the third article is the second type, the control system transports the third article from the third conveyor to the second conveyor, and if the type of the fourth article is the first type and there is room for arranging a new article on the first conveyor, the control system transports the fourth article from the third conveyor to the first conveyor, and if the type of the fourth article is the second type and there is room for arranging a new article on the second conveyor, the control system transports the fourth article from the third conveyor to the second conveyor.

According to this configuration, if there are a plurality of types of articles having mutually different attributes, a plurality of articles of the same type can be arranged on each of the first conveyor and the second conveyor as much as possible. Accordingly, it is possible to arrange a plurality of articles of the same type side by side on each of the first conveyor and the second conveyor as much as possible, and deliver the articles to each of the first transfer device and the second transfer device. As a result, it is possible to simplify the operation of transferring articles of the same type together to each of the two transfer devices, and the operation of storing articles of the same type together in the storage portion.

In the above configuration, it is preferable that if the type of the third article is neither the first type nor the second type, the control system arranges the third article on the second side in the first direction with respect to the second connection portion of the third conveyor, if the type of the fourth article is the second type, the control system transports the fourth article from the third conveyor to the second conveyor, and if the type of the fourth article is not the second type, the control system arranges the fourth article on the second side in the first direction with respect to the second connection portion of the third conveyor, and if the type of a fifth article transported subsequent to the fourth article is the second type, the control system transports the fifth article from the third conveyor to the second conveyor.

According to this configuration, the portion of the third conveyor on the second side in the first direction with respect to the second connection portion can be used as a buffer for switching the order of the articles. By using the third conveyor as a buffer in this way, it is easy to arrange a plurality of articles of the same type on the second conveyor.

Also, it is preferable that if the type of the third article is neither the first type nor the second type, the control system transports the third article from the third conveyor to the second conveyor, and if the type of the fourth article is the first type and there is room for arranging a new article on the first conveyor, the control system transports the fourth article from the third conveyor to the first conveyor.

According to this configuration, the second conveyor can be used as a buffer for switching the order of articles. By using the second conveyor as a buffer in this manner, it is easy to arrange a plurality of articles of the same type on the first conveyor.

In the above configuration, the article storage facility according to claim 5, in which if the type of a fifth article transported subsequent to the fourth article is the second type, the control system moves the third article from the second conveyor to the third conveyor to arrange the third article on the second side in the first direction with respect to the second connection portion of the third conveyor, and transports the fifth article from the third conveyor to the second conveyor, and if the type of the fifth article is not the second type, the control system moves the third article from the second conveyor to the third conveyor to arrange the third article on the second side in the first direction with respect to the second connection portion of the third conveyor and arranges the fifth article on the second side in the first direction with respect to the second connection portion of the third conveyor, and if the type of a sixth article transported subsequent to the fifth article is the second type, the control system transports the sixth article from the third conveyor to the second conveyor.

According to this configuration, the second conveyor and the portion of the third conveyor on the second side in the first direction with respect to the second connection portion can be used as a buffer for switching the order of the articles. By using the second conveyor and the third conveyor as buffers in this manner, it is easy to arrange a plurality of articles of the same type on the first conveyor and the second conveyor.

Also, it is preferable that the attribute is a dimension of an outer shape of the article, and the type of the article is determined according to which predetermined dimension class the dimension of the article belongs to.

According to this configuration, the outer dimensions of the plurality of articles arranged side by side in the second direction can be made relatively close to each other on each of the first conveyor and the second conveyor. Accordingly, it is easy to transfer a plurality of articles from the first conveyor to the first transfer device at the same time and to transfer a plurality of articles from the second conveyor to the second transfer device at the same time. Also, according to this configuration, the outer dimensions of the plurality of articles arranged side by side in the second direction can be made relatively close to each other in each of the first transfer device and the second transfer device. Accordingly, it is easy to transfer a plurality of articles from the first transfer device to the storage portion at the same time and transfer a plurality of articles from the second transfer device to the storage portion at the same time.

The article storage facility according to the present disclosure need only achieve at least one of the effects described above.

DESCRIPTION OF REFERENCE SIGNS

1: Article storage facility
4: Supply device
4A: First conveyor
4B: Second conveyor
4C: Third conveyor
5A: First connection portion
5B: Second connection portion
9: Buffer region
10: Storage rack
11: Storage portion
20: Transport device
21: Travel cart
30A: First transfer device
30B: Second transfer device
31: Placement portion
L: Loading position
S: Control system
W: Article
W1: First article
W2: Second article
W3: Third article
W4: Fourth article
W5: Fifth article
W6: Sixth article
X: First direction
X1: First side in first direction
X2: Second side in first direction
Y: Second direction
Y1: First side in second direction
Y2: Second side in second direction
Z: Up-down direction

The invention claimed is:

1. An article storage facility comprising:
a transport device comprising a travel cart configured to travel along a predetermined first direction;
a storage rack comprising a plurality of storage portions arranged along the first direction; and
a supply device configured to supply an article to the transport device, and
wherein:
a direction orthogonal to the first direction in a view in an up-down direction is a second direction, one side in the first direction is a first side in the first direction, another side in the first direction is a second side in the first direction, one side in the second direction is a first side in the second direction, and another side in the second direction is a second side in the second direction,
the transport device comprises a first transfer device and a second transfer device mounted on the travel cart,
the second transfer device is arranged on the first side in the first direction with respect to the first transfer device,
each of the first transfer device and the second transfer device comprises a placement portion on which a plurality of the articles are capable of being placed side by side in the second direction, and performs a transfer operation of the articles between the placement portion and the storage portion by moving the articles in the second direction,
the supply device comprises a first conveyor arranged so as to be adjacent on the first side in the second direction with respect to the first transfer device when the travel cart is at a predetermined loading position, a second conveyor that is arranged on the first side in the first direction with respect to the first conveyor and is arranged so as to be adjacent on the first side in the second direction with respect to the second transfer device when the travel cart is at the loading position, and a third conveyor that comprises a first connection portion connected to an end on the first side in the second direction of the first conveyor and a second connection portion that is connected to an end on the first side in the second direction of the second conveyor, the third conveyor is configured to transport the article in the first direction, the first connection portion is provided at an end on the second side in the first direction of the third conveyor, the first conveyor is configured to transport the article in the second direction, and a plurality of the articles are capable of being arranged side by side in the second direction thereon, the second conveyor is configured to transport the article in the second direction, and a plurality of the articles are capable of being arranged side by side in the second direction thereon, and at least the second conveyor of the first conveyor and the second conveyor is configured to transport the article to the third conveyor.

2. The article storage facility according to claim 1, wherein the third conveyor comprises, between the first connection portion and the second connection portion in the first direction, a buffer region in which at least one article is capable of being arranged.

3. The article storage facility according to claim 1, further comprising:

a control system configured to control the supply device, and wherein:

the articles have a plurality of types with mutually different attributes, the plurality of articles transported along the third conveyor are, in order starting from the second side in the first direction, which is a downstream side in a transport direction, a first article, a second article, a third article, and a fourth article, the control system transports the first article from the third conveyor to the first conveyor, the type of the first article is a first type, if the type of the second article is the first type, the control system transports the second article from the third conveyor to the first conveyor, and if the type of the second article is a second type that is different from the first type, the control system transports the second article from the third conveyor to the second conveyor, if the type of the third article is the first type, the control system transports the third article from the third conveyor to the first conveyor, and if the type of the third article is the second type, the control system transports the third article from the third conveyor to the second conveyor, and if the type of the fourth article is the first type and there is room for arranging a new article on the first conveyor, the control system transports the fourth article from the third conveyor to the first conveyor, and if the type of the fourth article is the second type and there is room for arranging a new article on the second conveyor, the control system transports the fourth article from the third conveyor to the second conveyor.

4. The article storage facility according to claim 3, wherein:

if the type of the third article is neither the first type nor the second type, the control system arranges the third article on the second side in the first direction with respect to the second connection portion of the third conveyor, if the type of the fourth article is the second type, the control system transports the fourth article from the third conveyor to the second conveyor, and if the type of the fourth article is not the second type, the control system arranges the fourth article on the second side in the first direction with respect to the second connection portion of the third conveyor, and if the type of a fifth article transported subsequent to the fourth article is the second type, the control system transports the fifth article from the third conveyor to the second conveyor.

5. The article storage facility according to claim 3, wherein:

if the type of the third article is neither the first type nor the second type, the control system transports the third article from the third conveyor to the second conveyor, and if the type of the fourth article is the first type and there is room for arranging a new article on the first conveyor, the control system transports the fourth article from the third conveyor to the first conveyor.

6. The article storage facility according to claim 5, wherein:

if the type of a fifth article transported subsequent to the fourth article is the second type, the control system moves the third article from the second conveyor to the third conveyor to arrange the third article on the second side in the first direction with respect to the second connection portion of the third conveyor, and transports the fifth article from the third conveyor to the second conveyor, and if the type of the fifth article is not the second type, the control system moves the third article from the second conveyor to the third conveyor to arrange the third article on the second side in the first direction with respect to the second connection portion of the third conveyor and arranges the fifth article on the second side in the first direction with respect to the second connection portion of the third conveyor, and if the type of a sixth article transported subsequent to the fifth article is the second type, the control system transports the sixth article from the third conveyor to the second conveyor.

7. The article storage facility according to claim 3, wherein:

the attribute is a dimension of an outer shape of the article, and the type of the article is determined according to which predetermined dimension class the dimension of the article belongs to.

8. An article storage facility comprising:

a transport device comprising a travel cart configured to travel along a predetermined first direction;

a storage rack comprising a plurality of storage portions arranged along the first direction; and a supply device configured to supply an article to the transport device, and wherein:

a direction orthogonal to the first direction in a view in an up-down direction is a second direction, one side in the first direction is a first side in the first direction, another side in the first direction is a second side in the first direction, one side in the second direction is a first side in the second direction, and another side in the second direction is a second side in the second direction, the transport device comprises a first transfer device and a second transfer device mounted on the travel cart, the second transfer device is arranged on the first side in the first direction with respect to the first transfer device, each of the first transfer device and the second transfer device comprises a placement portion on which a plurality of the articles are capable of being placed side by side in the second direction, and performs a transfer operation of the articles between the placement portion and the storage portion by moving the articles in the second direction, the supply device comprises a first conveyor arranged so as to be adjacent on the first side in the second direction with respect to the first transfer device when the travel cart is at a predetermined loading position, a second conveyor that is arranged on the first side in the first direction with respect to the first conveyor and is arranged so as to be adjacent on the first side in the second direction with respect to the second transfer device when the travel cart is at the loading position, and a third conveyor that comprises a first connection portion connected to an end on the first side in the second direction of the first conveyor and a second connection portion that is connected to an end on the first side in the second direction of the second conveyor, the third conveyor is configured to transport the article in the first direction, the first connection portion is provided at an end on the second side in the first direction of the third conveyor, the first conveyor is configured to transport the article in the second direction, and a plurality of the articles are capable of being arranged side by side in the second direction thereon, the second conveyor is configured to transport the article in the second direction, and a plurality of the articles are capable of being arranged side by side in the second direction thereon, and the third conveyor comprises, between the first connection portion and the second connection portion in the first direction, a buffer region in which at least one article is capable of being arranged.

9. An article storage facility comprising:

a transport device comprising a travel cart configured to travel along a predetermined first direction;

a storage rack comprising a plurality of storage portions arranged along the first direction; and a supply device configured to supply an article to the transport device, and wherein:

a direction orthogonal to the first direction in a view in an up-down direction is a second direction, one side in the first direction is a first side in the first direction, another side in the first direction is a second side in the first direction, one side in the second direction is a first side in the second direction, and another side in the second direction is a second side in the second direction, the transport device comprises a first transfer device and a second transfer device mounted on the travel cart, the second transfer device is arranged on the first side in the first direction with respect to the first transfer device, each of the first transfer device and the second transfer device comprises a placement portion on which a plurality of the articles are capable of being placed side by side in the second direction, and performs a transfer operation of the articles between the placement portion and the storage portion by moving the articles in the second direction, the supply device comprises a first conveyor arranged so as to be adjacent on the first side in the second direction with respect to the first transfer device when the travel cart is at a predetermined loading position, a second conveyor that is arranged on the first side in the first direction with respect to the first conveyor and is arranged so as to be adjacent on the first side in the second direction with respect to the second transfer device when the travel cart is at the loading position, and a third conveyor that comprises a first connection portion connected to an end on the first side in the second direction of the first conveyor and a second connection portion that is connected to an end on the first side in the second direction of the second conveyor, the third conveyor is configured to transport the article in the first direction, the first connection portion is provided at an end on the second side in the first direction of the third conveyor, the first conveyor is configured to transport the article in the second direction, and a plurality of the articles are capable of being arranged side by side in the second direction thereon, the second conveyor is configured to transport the article in the second direction, and a plurality of the articles are capable of being arranged side by side in the second direction thereon, a control system configured to control the supply device is provided, the articles have a plurality of types with mutually different attributes, the plurality of articles transported along the third conveyor are, in order starting from the second side in the first direction, which is a downstream side in a transport direction, a first article, a second article, a third article, and a fourth article, the control system transports the first article from the third conveyor to the first conveyor, the type of the first article is a first type, if the type of the second article is the first type, the control system transports the second article from the third conveyor to the first conveyor, and if the type of the second article is a second type that is different from the first type, the control system transports the second article from the third conveyor to the second conveyor, if the type of the third article is the first type, the control system transports the third article from the third conveyor to the first conveyor, and if the type of the third article is the second type, the control system transports the third article from the third conveyor to the second conveyor, if the type of the fourth article is the first type and there is room for arranging a new article on the first conveyor, the control system transports the fourth article from the third conveyor to the first conveyor, and if the type of the fourth article is the second type and there is room for arranging a new article on the second conveyor, the control system transports the fourth article from the third conveyor to the second conveyor, if the type of the third article is neither the first type nor the second type, the control system arranges the third article on the second side in the first direction with respect to the second connection portion of the third conveyor, if the type of the fourth article is the second type, the control system transports the fourth article from the third conveyor to the second conveyor, and if the type of the fourth article is not the second type, the control system arranges the fourth article on the second side in the first direction with respect to the second connection portion of the third conveyor, and if the type of a fifth article transported subsequent to the fourth article is the second type, the control system transports the fifth article from the third conveyor to the second conveyor.

10. An article storage facility comprising:

a transport device comprising a travel cart configured to travel along a predetermined first direction;

a storage rack comprising a plurality of storage portions arranged along the first direction; and a supply device configured to supply an article to the transport device, and wherein:

a direction orthogonal to the first direction in a view in an up-down direction is a second direction, one side in the first direction is a first side in the first direction, another side in the first direction is a second side in the first direction, one side in the second direction is a first side in the second direction, and another side in the second direction is a second side in the second direction, the transport device comprises a first transfer device and a second transfer device mounted on the travel cart, the second transfer device is arranged on the first side in the first direction with respect to the first transfer device, each of the first transfer device and the second transfer device comprises a placement portion on which a plurality of the articles are capable of being placed side by side in the second direction, and performs a transfer operation of the articles between the placement portion and the storage portion by moving the articles in the second direction, the supply device comprises a first conveyor arranged so as to be adjacent on the first side in the second direction with respect to the first transfer device when the travel cart is at a predetermined loading position, a second conveyor that is arranged on the first side in the first direction with respect to the first conveyor and is arranged so as to be adjacent on the first side in the second direction with respect to the second transfer device when the travel cart is at the loading position, and a third conveyor that comprises a first connection portion connected to an end on the first side in the second direction of the first conveyor and a second connection portion that is connected to an end on the first side in the second direction of the second conveyor, the third conveyor is configured to transport the article in the first direction, the first connection portion is provided at an end on the second side in the first direction of the third conveyor, the first conveyor is configured to transport the article in the second direction, and a plurality of the articles are capable of being arranged side by side in the second direction thereon, the second conveyor is configured to transport the article in the second direction, and a plurality of the articles are capable of being arranged side by side in the second direction thereon, a control system configured to control the supply device is provided, the articles have a plurality of types with mutually different attributes, the plurality of articles transported along the third conveyor are, in order starting from the second side in the first direction, which is a downstream side in a transport direction, a first article, a second article, a third article, and a fourth article, the control system transports the first article from the third conveyor to the first conveyor, the type of the first article is a first type, if the type of the second article is the first type, the control system transports the second article from the third conveyor to the first conveyor, and if the type of the second article is a second type that is different from the first type, the control system transports the second article from the third conveyor to the second conveyor, if the type of the third article is the first type, the control system transports the third article from the third conveyor to the first conveyor, and if the type of the third article is the second type, the control system transports the third article from the third conveyor to the second conveyor, if the type of the fourth article is the first type and there is room for arranging a new article on the first conveyor, the control system transports the fourth article from the third conveyor to the first conveyor, and if the type of the fourth article is the second type and there is room for arranging a new article on the second conveyor, the control system transports the fourth article from the third conveyor to the second conveyor, if the type of the third article is neither the first type nor the second type, the control system transports the third article from the third conveyor to the second conveyor, and if the type of the fourth article is the first type and there is room for arranging a new article on the first conveyor, the control system transports the fourth article from the third conveyor to the first conveyor.

* * * * *